United States Patent
Patchava et al.

(10) Patent No.: US 12,519,341 B2
(45) Date of Patent: Jan. 6, 2026

(54) CONTROL INFORMATION ACQUISITION BASED ON BACKSCATTERING FOR A WIDEBAND CHANNEL

(71) Applicant: QUALCOMM Incorporated, San Diego, CA (US)

(72) Inventors: Raviteja Patchava, San Diego, CA (US); Piyush Gupta, Bridgewater, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 18/058,218

(22) Filed: Nov. 22, 2022

(65) Prior Publication Data

US 2024/0171006 A1     May 23, 2024

(51) Int. Cl.
*H02J 50/00*     (2016.01)
*H04B 17/30*     (2015.01)
*H04L 5/00*     (2006.01)

(52) U.S. Cl.
CPC .......... *H02J 50/001* (2020.01); *H04B 17/30* (2015.01); *H04L 5/0094* (2013.01)

(58) Field of Classification Search
CPC .......... H04J 50/001; H04J 50/80; H04J 50/20; H04J 50/402; H04J 50/40; H04B 17/30; H04L 5/0094
See application file for complete search history.

(56) References Cited

U.S. PATENT DOCUMENTS

| | | | | |
|---|---|---|---|---|
| 11,824,370 | B2* | 11/2023 | Caglayan | H02J 50/001 |
| 12,133,255 | B2* | 10/2024 | Elkotby | H02J 50/40 |
| 12,176,726 | B2* | 12/2024 | Lee | H02J 50/20 |
| 2024/0313582 | A1* | 9/2024 | Belo | H02J 50/80 |

OTHER PUBLICATIONS

International Search Report and Written Opinion—PCT/US2023/076588—ISA/EPO—Mar. 6, 2024.
Liu W., et al., "Next Generation Backscatter Communication: Systems, Techniques, and Applications", Eurasip Journal on Wireless Communications and Networking, [Online] vol. 2019, No. 1, Dec. 1, 2019, p. 69, pp. 1-11, XP055816082, the whole document.

(Continued)

*Primary Examiner* — Chandrahas B Patel
(74) *Attorney, Agent, or Firm* — Paul M. McAdams; Polsinelli LLP

(57) ABSTRACT

Systems and techniques are provided for wireless communication. For example, a network device can transmit radio frequency (RF) signals. Each RF signal of the RF signals is associated with a respective sub-band of sub-bands included in a wideband bandwidth. The network device can receive, from an energy harvesting (EH)-capable device, backscatter RF signals. Each backscatter RF signal of the backscatter RF signals is associated with a respective RF signal of the RF signals. Each backscatter RF signal and each respective RF signal are associated with a respective sub-band of the sub-bands included in the wideband bandwidth. The network device can determine control information associated with the wideband bandwidth based on the backscatter RF signals.

29 Claims, 16 Drawing Sheets

(56) References Cited

OTHER PUBLICATIONS

Sample A.P., et al., "Design of a Passively-Powered, Programmable Sensing Platform for UHF RFID Systems", RFID, 2007. IEEE International Conference on, IEEE, PI, Jan. 1, 2007, pp. 149-156, XP031174020, the whole document.

Yang G., et al., "Multi-antenna Wireless Energy Transfer for Backscatter Communication Systems", IEEE Journal on Selected Areas in Communications, IEEE Service Center, Piscataway, US, vol. 33, No. 12, Dec. 1, 2015, pp. 2974-2987, XP011590336, the whole document.

* cited by examiner

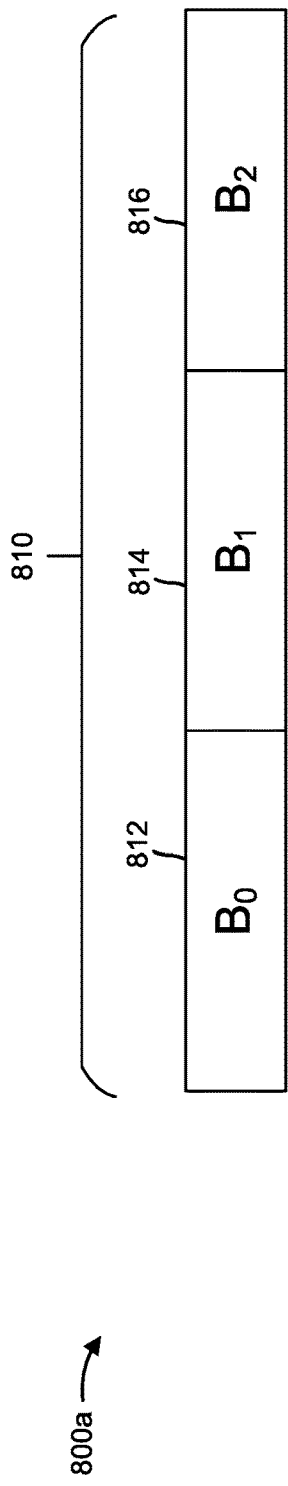
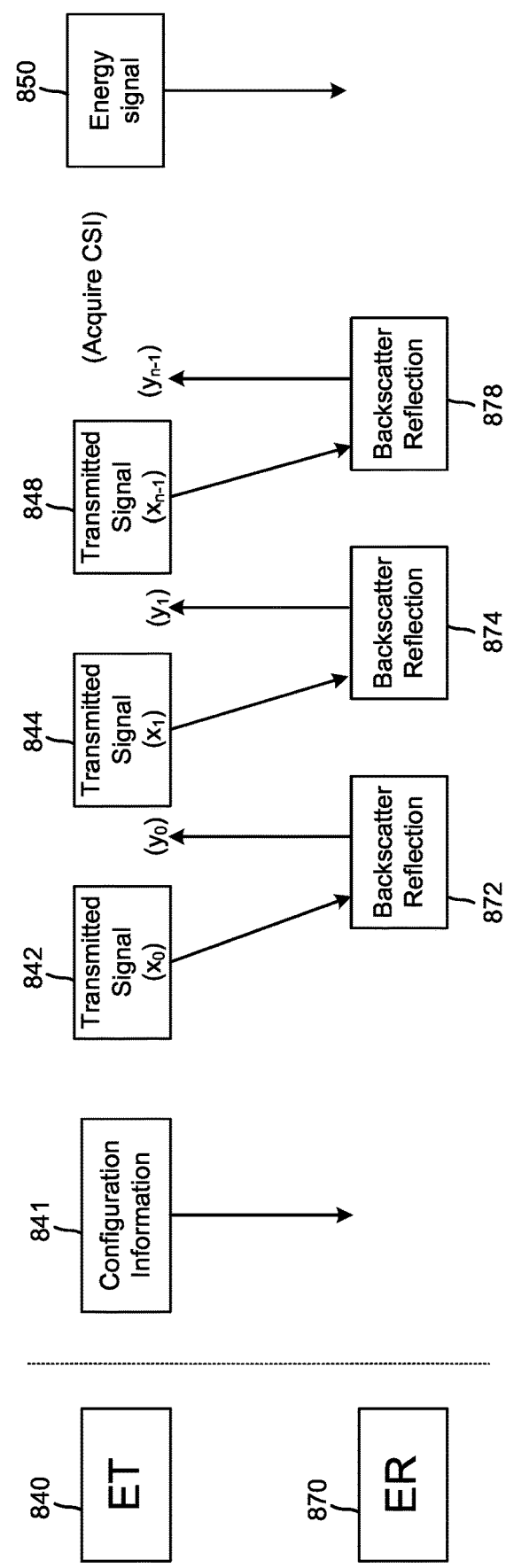
FIG. 8A
FIG. 8B

CONTROL INFORMATION ACQUISITION BASED ON BACKSCATTERING FOR A WIDEBAND CHANNEL

FIELD

Aspects of the present disclosure generally relate to wireless communication. For example, aspects of the present disclosure relate to control information (channel state information (CSI) or other control information) acquisition based on backscattering for a wideband channel.

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a network entity for wireless communication is provided. The network entity includes at least one memory and at least one processor coupled to the at least one memory. The at least one processor is configured to: transmit a plurality of radio frequency (RF) signals, wherein each RF signal of the plurality of RF signals is associated with a respective sub-band of a plurality of sub-bands included in a wideband bandwidth; receive, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and determine control information associated with the wideband bandwidth based on the first plurality of backscatter RF signals.

In another illustrative example, a method of wireless communication performed by a network entity is provided. The method includes: transmitting a plurality of radio frequency (RF) signals, wherein each RF signal of the plurality of RF signals is associated with a respective sub-band of a plurality of sub-bands included in a wideband bandwidth; receiving, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and determining control information associated with the wideband bandwidth based on the first plurality of backscatter RF signals.

In another example, a non-transitory computer-readable medium is provided having stored thereon instructions that, when executed by at least one processor, cause the at least one processor to: transmit a plurality of radio frequency (RF) signals, wherein each RF signal of the plurality of RF signals is associated with a respective sub-band of a plurality of sub-bands included in a wideband bandwidth; receive, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and determine control information associated with the wideband bandwidth based on the first plurality of backscatter RF signals.

In another example, an apparatus for wireless communications is provided. The apparatus comprises: means for transmitting a plurality of radio frequency (RF) signals, wherein each RF signal of the plurality of RF signals is associated with a respective sub-band of a plurality of sub-bands included in a wideband bandwidth; means for receiving, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and means for determining control information associated with the wideband bandwidth based on the first plurality of backscatter RF signals.

In another illustrative example, an energy harvesting (EH)-capable device for wireless communication is provided. The EH-capable device includes at least one memory and at least one processor coupled to the at least one memory. The at least one processor is configured to: receive, from a network entity, a plurality of radio frequency (RF) signals, wherein each RF signal of the plurality of RF signals is associated with a respective sub-band of a plurality of sub-bands included in a wideband bandwidth; and transmit, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

In another example, a method of wireless communication performed by an energy harvesting (EH)-capable device is provided. The method includes: receiving, from a network entity, a plurality of radio frequency (RF) signals, wherein each RF signal of the plurality of RF signals is associated with a respective sub-band of a plurality of sub-bands included in a wideband bandwidth; and transmitting, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

In another example, a non-transitory computer-readable medium is provided having stored thereon instructions that, when executed by at least one processor, cause the at least one processor to: receive, from a network entity, a plurality of radio frequency (RF) signals, wherein each RF signal of the plurality of RF signals is associated with a respective sub-band of a plurality of sub-bands included in a wideband bandwidth; and transmit, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

In another example, an apparatus for wireless communications is provided. The apparatus comprises: means for receiving, from a network entity, a plurality of radio frequency (RF) signals, wherein each RF signal of the plurality of RF signals is associated with a respective sub-band of a plurality of sub-bands included in a wideband bandwidth; and means for transmitting, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 8A is a diagram illustrating an example of a wideband bandwidth divided into three sub-bands, in accordance with some examples;

FIG. 8B is a diagram illustrating an example of communications between an energy transmitter and an energy receiver for determining control information associated with a wideband bandwidth, in accordance with some examples;

DETAILED DESCRIPTION

Figure 1:
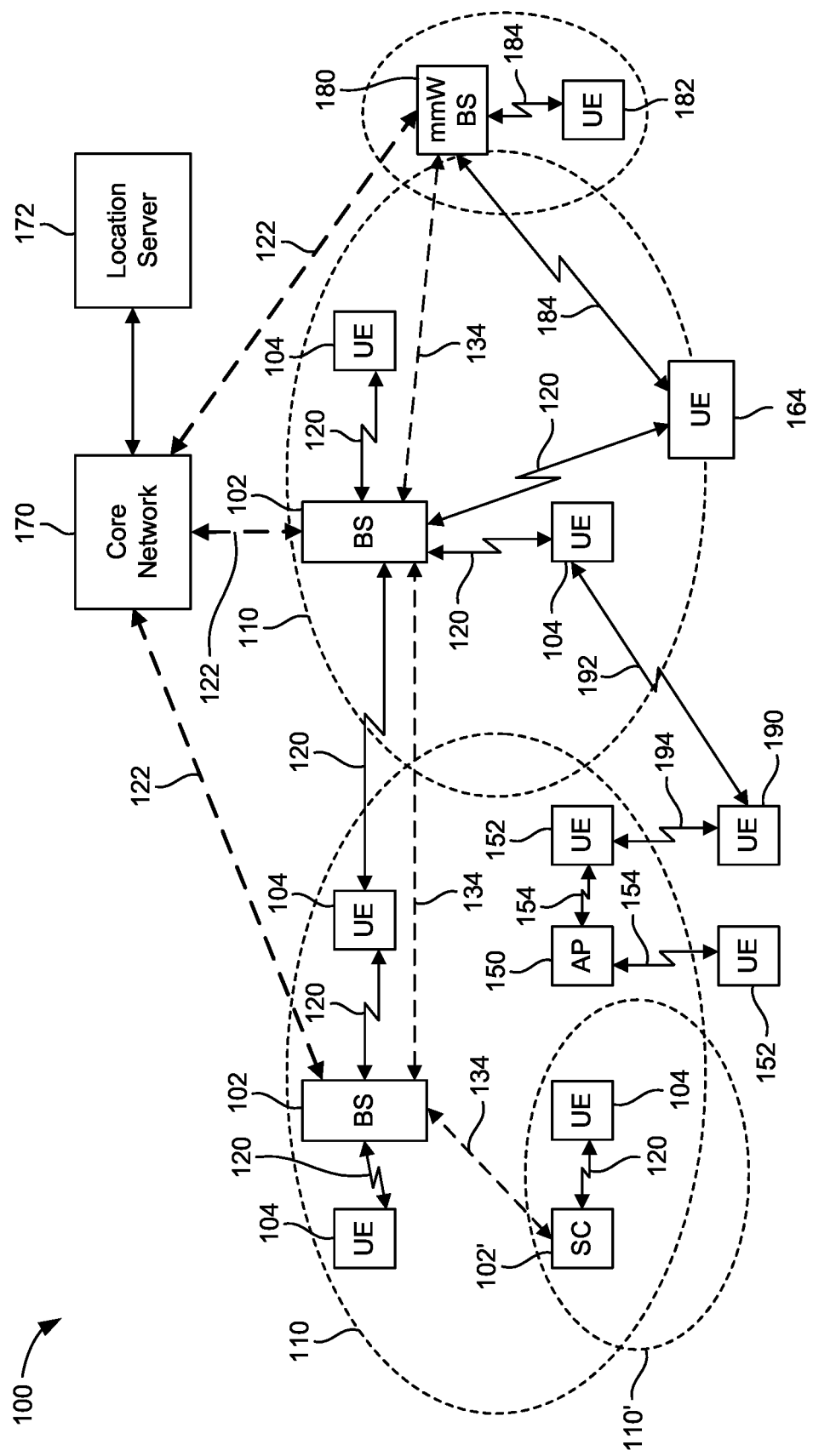
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, various client devices can be utilized that may be associated with different signaling and communication needs. For example, as 5G networks expand into industrial verticals and the quantity of deployed Internet-of-Things (IoT) devices grows, network service categories such as enhanced Mobile Broadband (eMBB), Ultra Reliable Low Latency Communications (URLLC), and massive Machine Type Communications (mMTC), etc., may be expanded to better support various IoT devices, which can include passive IoT devices, semi-passive IoT devices, etc.

For example, passive IoT devices and semi-passive IoT devices are relatively low-cost UEs that may be used to implement one or more sensing and communication capabilities in an IoT network or deployment. In some examples, passive and/or semi-passive IoT sensors (e.g., devices) can be used to provide sensing capabilities for various processes and use cases, such as asset management, logistics, warehousing, manufacturing, etc. Passive and semi-passive IoT devices can include one or more sensors, a processor or micro-controller, and an energy harvester for generating electrical power from incident downlink radio frequency (RF) signals received at the passive or semi-passive IoT device.

Based on harvesting energy from incident downlink RF signals (e.g., transmitted by a network device such as a base station, gNB, etc.), energy harvesting devices (e.g., such as passive IoT devices, semi-passive IoT devices, etc.) can be provided without an energy storage element and/or can be provided with a relatively small energy storage element (e.g., battery, capacitor, etc.) Energy harvesting devices can be deployed at large scales, based on the simplification in their manufacture and deployment associated with implementing wireless energy harvesting.

In a wireless communication network environment (e.g., cellular network, etc.), a network device (e.g., such as a base station or gNB, etc.) can be used to transmit downlink RF signals to energy harvesting devices. In one illustrative example, a base station or gNB can read and/or write information stored on energy harvesting IoT devices by transmitting the downlink RF signal. A downlink RF signal can provide energy to an energy harvesting IoT device and can be used as the basis for an information-bearing uplink signal transmitted back to the network device by the energy harvesting IoT device (e.g., based on reflecting or backscattering a portion of the incident downlink RF signal). The base station or gNB can read the reflected signal transmitted by an energy harvesting IoT device to decode the information transmitted by the IoT device (e.g., such as sensor information collected by one or more sensors included in the IoT device, etc.).

In some examples, for a given downlink signal with a given input RF power received at an energy harvesting device, a first portion of the input RF power is provided to the device's energy harvester (e.g., with a percentage being converted to useful electrical power based on the conversion efficiency of the harvester, and the remaining percentage wasted or dissipated as heat, etc.). A remaining, second portion of the input RF power is available for use in the backscattered uplink transmission (e.g., the second portion of the input power is reflected and modulated with the uplink communication).

There is a need to improve an energy conversion efficiency associated with energy harvesting devices (e.g., including passive and semi-passive IoT devices). In some cases, there is a further need to provide a greater communication range associated with passive and/or semi-passive energy harvesting devices (e.g., passive and/or semi-passive IoT devices).

Systems, apparatuses, processes (also referred to as methods), and computer-readable media (collectively referred to as "systems and techniques") are described herein that can be used to provide improved wireless energy harvesting and/or backscatter modulation-based communications between an energy harvesting device (e.g., passive, semi-passive, or active IoT device, etc.) and a network node or transmitter (e.g., gNB or base station). For example, the systems and techniques described herein can be used to provide wireless energy transfer over an improved (e.g., greater) communication range or distance. In some cases, a range of wireless energy transfer can be improved based on a channel selection, a frequency selection, and/or spatial beamforming performed by an energy transmitter (e.g., network node).

For example, the channel or frequency selection and/or the spatial beamforming can be performed based on control information associated with one or more channels between the energy transmitter (e.g., network node) and an energy receiver (e.g., energy harvesting device). In some cases, the control information can include Channel State Information (CSI) associated with a wideband channel between the energy transmitter and the energy receiver. In some examples, an energy transmitter can transmit a plurality of radio frequency (RF) signals to an energy receiver (e.g., energy harvesting device). Each RF signal included in the plurality of RF signals can be associated with a different sub-band of a wideband bandwidth (e.g., the wideband channel for which CSI or other control information can be determined).

The plurality of RF signals can be transmitted using time division multiplexing (TDM). For example, a wideband channel can be divided into three different sub-bands and three RF signals can be transmitted using TDM (e.g., transmitting a first RF signal, transmitting a second RF signal after the first RF signal, and transmitting a third RF signal after the second RF signal). The respective RF signals included in the plurality of RF signals can be the same or can be different.

Based on receiving a respective RF signal included in the plurality of RF signals, the energy receiving device can generate and transmit a backscatter reflected RF signal. For example, the energy receiving device can receive an RF signal using a first frequency sub-band and backscatter the received RF signal by introducing a frequency shift to a different sub-band. In some examples, the backscatter reflected RF signal can be frequency shifted to an adjacent sub-band and/or can be cyclic shifted. Based on the respective backscatter reflected, frequency shifted RF signal transmitted for each input RF signal received at the energy receiver, the energy transmitter can determine control information (e.g., CSI) of the wideband channel between the energy transmitter and the energy receiver.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by abase station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
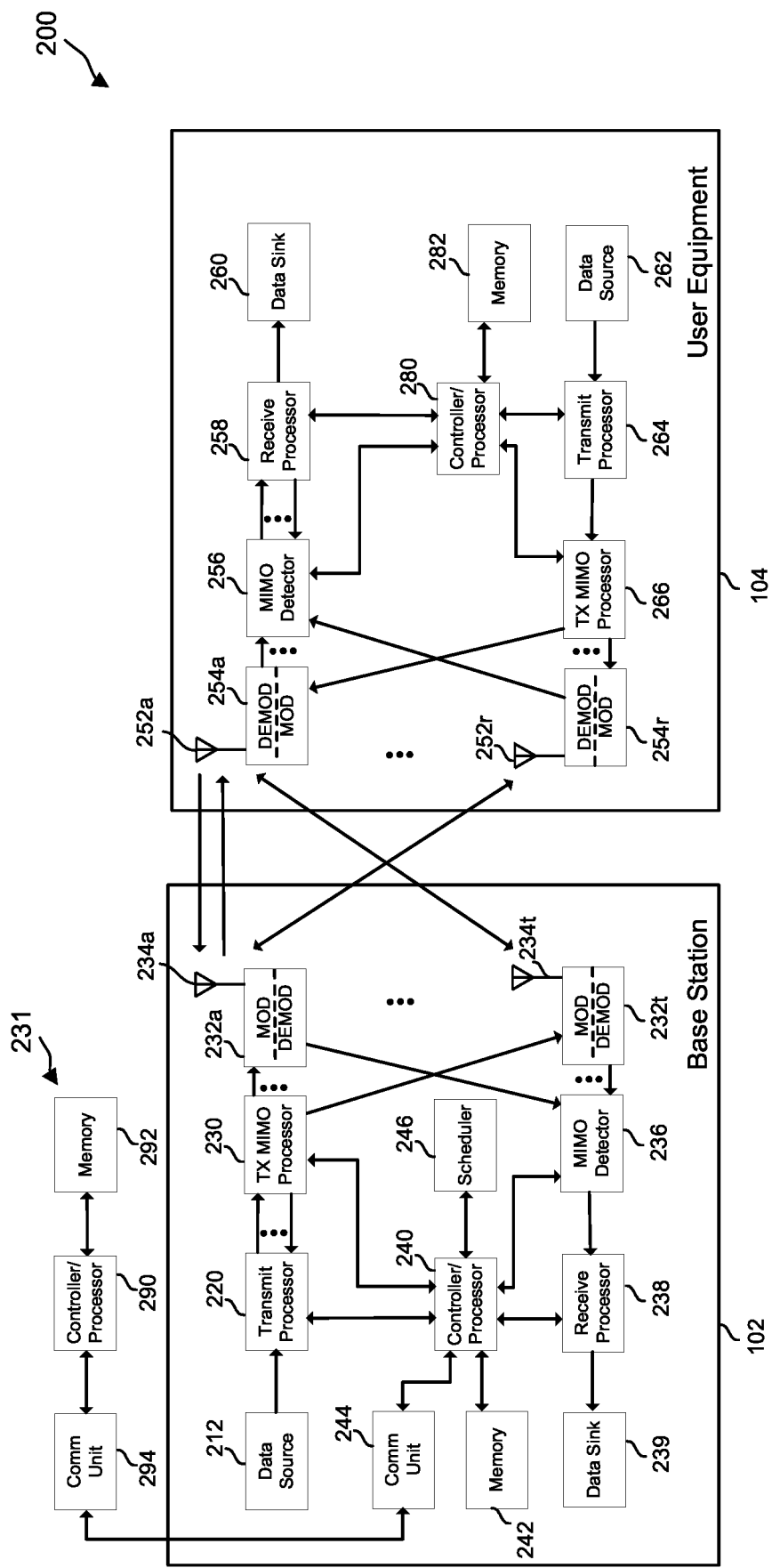
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream.

Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
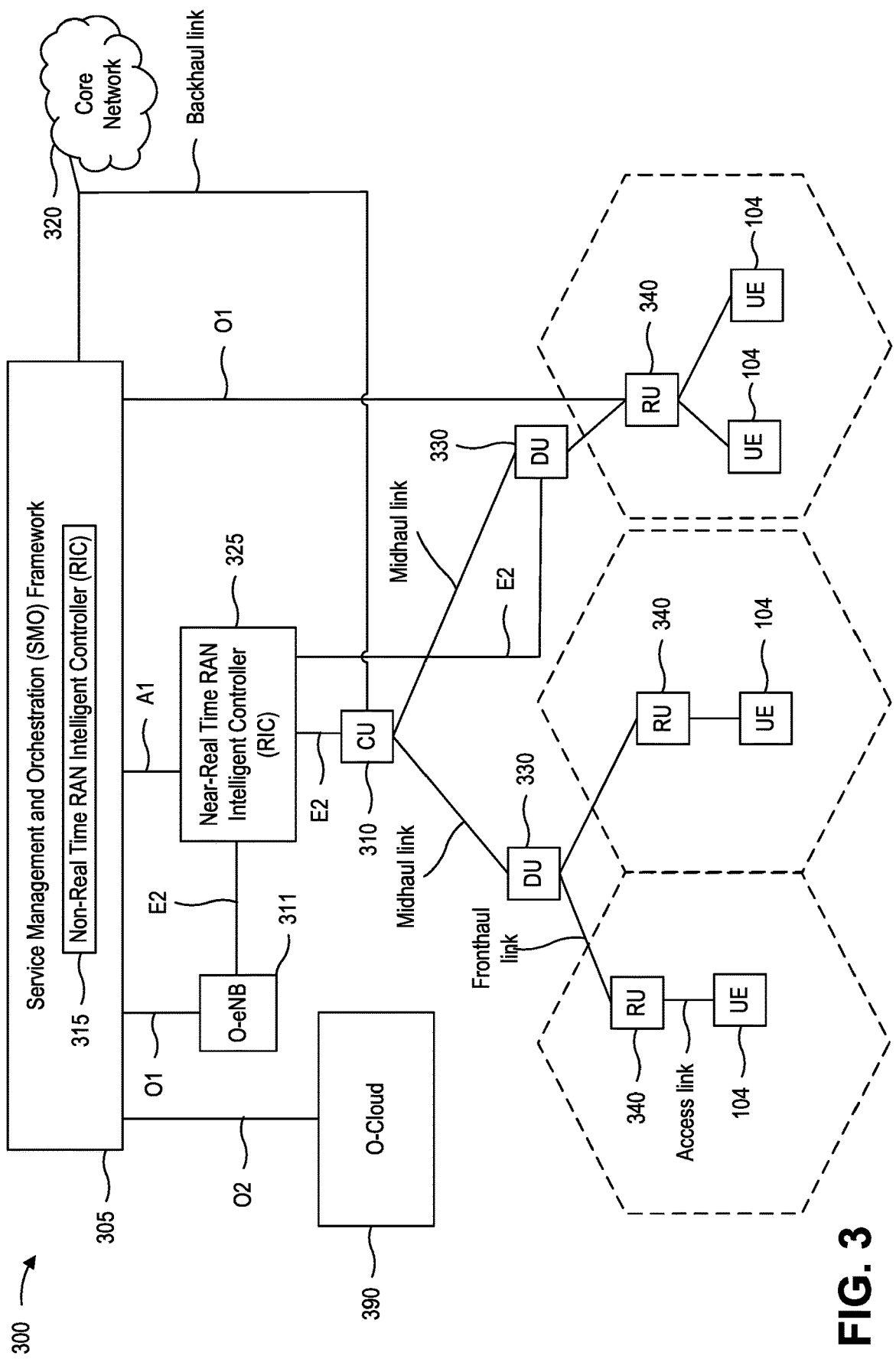
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
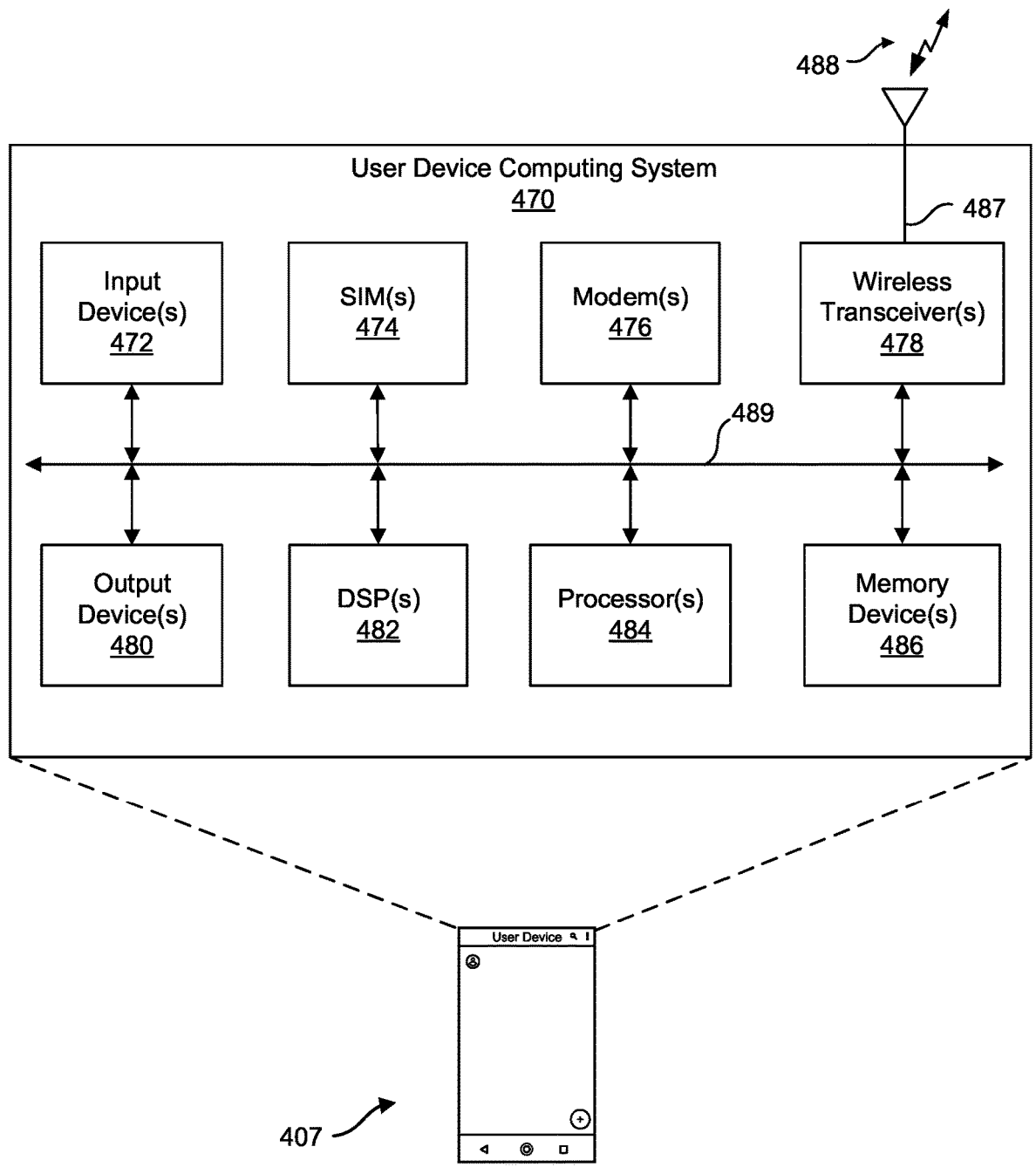
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like.

In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
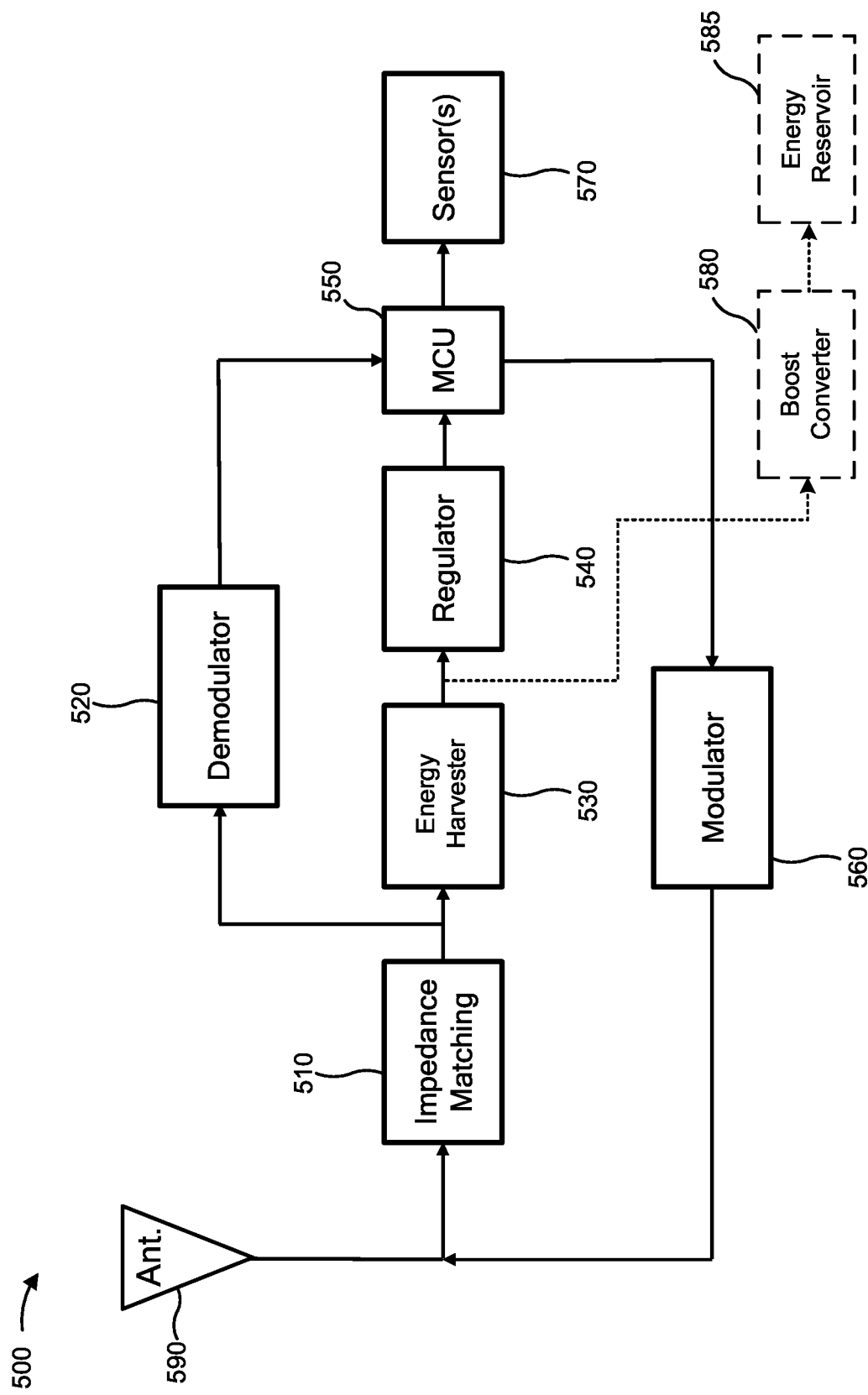
FIG. 5 is a diagram illustrating an example of a radio frequency (RF) energy harvesting device, in accordance with some examples.

FIG. 5 is a diagram illustrating an example of an architecture of a radio frequency (RF) energy harvesting device 500, in accordance with some examples. As will be described in greater depth below, the RF energy harvesting device 500 can harvest RF energy from one or more RF signals received using an antenna 590. As used herein, the term "energy harvesting" may be used interchangeably with "power harvesting." In some aspects, an "energy harvesting device" can be a device that is capable of performing energy harvesting (EH). For example, as used herein, the term "energy harvesting device" may be used interchangeably with the term "EH-capable device" or "energy harvesting-capable device." In some aspects, energy harvesting device 500 can be implemented as an Internet-of-Things (IoT) device, can be implemented as a sensor, etc., as will be described in greater depth below. In other examples, energy harvesting device 500 can be implemented as a Radio-Frequency Identification (RFID) tag or various other RFID devices.

The energy harvesting device 500 includes one or more antennas 590 that can be used to transmit and receive one or more wireless signals. For example, energy harvesting device 500 can use antenna 590 to receive one or more downlink signals and to transmit one or more uplink signals. An impedance matching component 510 can be used to match the impedance of antenna 590 to the impedance of one or more (or all) of the receive components included in energy harvesting device 500. In some examples, the receive components of energy harvesting device 500 can include a demodulator 520 (e.g., for demodulating a received downlink signal), an energy harvester 530 (e.g., for harvesting RF energy from the received downlink signal), a regulator 540, a micro-controller unit (MCU) 550, a modulator 560 (e.g., for generating an uplink signal). In some cases, the receive components of energy harvesting device 500 may further include one or more sensors 570.

The downlink signals can be received from one or more transmitters. For example, energy harvesting device 500 may receive a downlink signal from a network node or network entity that is included in a same wireless network as the energy harvesting device 500. In some cases, the network entity can be a base station, gNB, etc., that communicates with the energy harvesting device 500 using a cellular communication network. For example, the cellular communication network can be implemented according to the 3G, 4G, 5G, and/or other cellular standard (e.g., including future standards such as 6G and beyond).

In some cases, energy harvesting device 500 can be implemented as a passive or semi-passive energy harvesting device, which perform passive uplink communication by modulating and reflecting a downlink signal received via antenna 590. A passive or semi-passive energy harvesting device may also be referred to as a passive or semi-passive EH-capable device, respectively. For example, passive and semi-passive energy harvesting devices may be unable to generate and transmit an uplink signal without first receiving a downlink signal that can be modulated and reflected. In other examples, energy harvesting device 500 may be implemented as an active energy harvesting device, which utilizes a powered transceiver to perform active uplink communication. An active energy harvesting device is able to generate and transmit an uplink signal without first receiving a downlink signal (e.g., by using an on-device power source to energize its powered transceiver).

An active or semi-passive energy harvesting device (e.g., also referred to as an active EH-capable device or a semi-passive EH-capable device, respectively) may include one or more energy storage elements 585 (e.g., collectively referred to as an "energy reservoir"). For example, the one or more energy storage elements 585 can include batteries, capacitors, etc. In some examples, the one or more energy storage elements 585 may be associated with a boost converter 580. The boost converter 580 can receive as input at least a portion of the energy harvested by energy harvester 530 (e.g., with a remaining portion of the harvested energy being provided as instantaneous power for operating the energy harvesting device 500). In some aspects, the boost converter 580 may be a step-up converter that steps up voltage from its input to its output (e.g., and steps down current from its input to its output). In some examples, boost converter 580 can be used to step up the harvested energy generated by energy harvester 530 to a voltage level associated with charging the one or more energy storage elements 585. An active or semi-passive energy harvesting device may include one or more energy storage elements 585 and may include one or more boost converters 580. A quantity of energy storage elements 585 may be the same as or different than a quantity of boost converters 580 included in an active or semi-passive energy harvesting device.

A passive energy harvesting device (e.g., also referred to as a "passive EH-capable device") does not include an energy storage element 585 or other on-device power source. For example, a passive energy harvesting device may be powered using only RF energy harvested from a downlink signal (e.g., using energy harvester 530). As mentioned previously, a semi-passive energy harvesting device can include one or more energy storage elements 585 and/or other on-device power sources. The energy storage element 585 of a semi-passive energy harvesting device can be used to augment or supplement the RF energy harvested from a downlink signal. In some cases, the energy storage element 585 of a semi-passive energy harvesting device may store insufficient energy to transmit an uplink communication without first receiving a downlink communication (e.g., minimum transmit power of the semi-passive device>capacity of the energy storage element). An active energy harvesting device can include one or more energy storage elements 585 and/or other on-device power sources that can power uplink communication without using supplemental harvested RF energy (e.g., minimum transmit power of the active device<capacity of the energy storage element). The energy storage element(s) 585 included in an active energy harvesting device and/or a semi-passive energy harvesting device can be charged using harvested RF energy.

As mentioned above, passive and semi-passive energy harvesting devices transmit uplink communications by performing backscatter modulation to modulate and reflect a received downlink signal. The received downlink signal is used to provide both electrical power (e.g., to perform demodulation, local processing, and modulation) and a carrier wave for uplink communication (e.g., the reflection of the downlink signal). For example, a portion of the downlink signal will be backscattered as an uplink signal and a remaining portion of the downlinks signal can be used to perform energy harvesting.

Active energy harvesting devices can transmit uplink communications without performing backscatter modulation and without receiving a corresponding downlink signal (e.g., an active energy harvesting device includes an energy storage element to provide electrical power and includes a powered transceiver to generate a carrier wave for an uplink communication). In the absence of a downlink signal, passive and semi-passive energy harvesting devices cannot transmit an uplink signal (e.g., passive communication). Active energy harvesting devices do not depend on receiving a downlink signal in order to transmit an uplink signal and can transmit an uplink signal as desired (e.g., active communication).

In examples in which the energy harvesting device 500 is implemented as a passive or semi-passive energy harvesting device, a continuous carrier wave downlink signal may be received using antenna 590 and modulated (e.g., re-modulated) for uplink communication. In some cases, a modulator 560 can be used to modulate the reflected (e.g., backscattered) portion of the downlink signal. For example, the continuous carrier wave may be a continuous sinusoidal wave (e.g., sine or cosine waveform) and modulator 560 can perform modulation based on varying one or more of the amplitude and the phase of the backscattered reflection. Based on modulating the backscattered reflection, modulator 560 can encode digital symbols (e.g., such as binary symbols or more complex systems of symbols) indicative of an uplink communication or data message. For example, the uplink communication may be indicative of sensor data or other information associated with the one or more sensors 570 included in energy harvesting device 500.

As mentioned previously, impedance matching component 510 can be used to match the impedance of antenna 590 to the receive components of energy harvesting device 500 when receiving the downlink signal (e.g., when receiving the continuous carrier wave). In some examples, during backscatter operation (e.g., when transmitting an uplink signal), modulation can be performed based on intentionally mismatching the antenna input impedance to cause a portion of the incident downlink signal to be scattered back. The phase and amplitude of the backscattered reflection may be determined based on the impedance loading on the antenna 590. Based on varying the antenna impedance (e.g., varying the impedance mismatch between antenna 590 and the remaining components of energy harvesting device 500), digital symbols and/or binary information can be encoded (e.g., modulated) onto the backscattered reflection. Varying the antenna impedance to modulate the phase and/or amplitude of the backscattered reflection can be performed using modulator 560.

As illustrated in FIG. 5, a portion of a downlink signal received using antenna 590 can be provided to a demodulator 520, which performs demodulation and provides a downlink communication (e.g., carried or modulated on the downlink signal) to a micro-controller unit (MCU) 550 or other processor included in the energy harvesting device 500. A remaining portion of the downlink signal received using antenna 590 can be provided to energy harvester 530, which harvests RF energy from the downlink signal. For example, energy harvester 530 can harvest RF energy based on performing AC-to-DC (alternating current-to-direct current) conversion, wherein an AC current is generated from the sinusoidal carrier wave of the downlink signal and the converted DC current is used to power the energy harvesting device 500. In some aspects, energy harvester 530 can include one or more rectifiers for performing AC-to-DC conversion. A rectifier can include one or more diodes or thin-film transistors (TFTs). In one illustrative example, energy harvester 530 can include one or more Schottky diode-based rectifiers. In some cases, energy harvester 530 can include one or more TFT-based rectifiers.

The output of the energy harvester 530 is a DC current generated from (e.g., harvested from) the portion of the downlink signal provided to the energy harvester 530. In some aspects, the DC current output of energy harvester 530 may vary with the input provided to the energy harvester 530. For example, an increase in the input current to energy harvester 530 can be associated with an increase in the output DC current generated by energy harvester 530. In some cases, MCU 550 may be associated with a narrow band of acceptable DC current values. Regulator 540 can be used to remove or otherwise decrease variation(s) in the DC current generated as output by energy harvester 530. For example, regulator 540 can remove or smooth spikes (e.g., increases) in the DC current output by energy harvester 530 (e.g., such that the DC current provided as input to MCU 550 by regulator 540 remains below a first threshold). In some cases, regulator 540 can remove or otherwise compensate for drops or decreases in the DC current output by energy harvester 530 (e.g., such that the DC current provided as input to MCU 550 by regulator 540 remains above a second threshold).

In some aspects, the harvested DC current (e.g., generated by energy harvester 530 and regulated upward or downward as needed by regulator 530) can be used to power MCU 550 and one or more additional components included in the energy harvesting device 500. For example, the harvested DC current can additionally be used to power one or more (or all) of the impedance matching component 510, demodulator 520, regulator 540, MCU 550, sensors 570, modulator 560, etc. For example, sensors 570 and modulator 560 can receive at least a portion of the harvested DC current that remains after MCU 550 (e.g., that is not consumed by MCU 550). In some cases, the harvested DC current output by regulator 540 can be provided to MCU 550, modulator 560, and sensors 570 in series, in parallel, or a combination thereof.

In some examples, sensors 570 can be used to obtain sensor data (e.g., such as sensor data associated with an environment in which the energy harvesting device 500 is located). Sensors 570 can include one or more sensors, which may be of a same or different type(s). In some aspects, one or more (or all) of the sensors 570 can be configured to obtain sensor data based on control information included in a downlink signal received using antenna 590. For example, one or more of the sensors 570 can be configured based on a downlink communication obtained based on demodulating a received downlink signal using demodulator 520. In one illustrative example, sensor data can be transmitted based on using modulator 560 to modulate (e.g., vary one or more of amplitude and/or phase of) a backscatter reflection of the continuous carrier wave received at antenna 590. Based on modulating the backscattered reflection, modulator 560 can encode digital symbols (e.g., such as binary symbols or more complex systems of symbols) indicative of an uplink communication or data message. In some examples, modulator 560 can generate an uplink, backscatter modulated signal based on receiving sensor data directly from sensors 570. In some examples, modulator 560 can generate an uplink, backscatter modulated signal based on received sensor data from MCU 550 (e.g., based on MCU 550 receiving sensor data directly from sensors 570).

Figure 6:
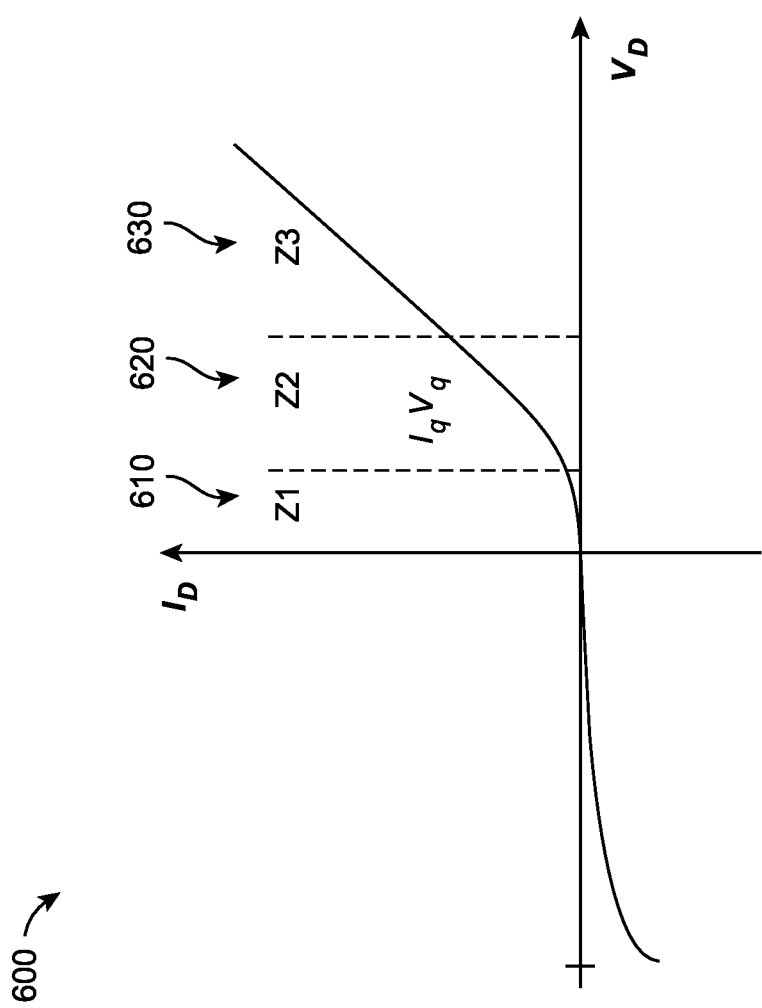
FIG. 6 is a diagram illustrating an example of small signal operation of a Schottky diode barrier, in accordance with some examples.

FIG. 6 is a diagram 600 illustrating an example of a small signal rectification operation that may be associated with performing energy harvesting, in accordance with some examples. In one illustrative example, the small signal rectification operation may be a small signal rectification operation associated with a Schottky diode barrier (e.g., a Schottky diode used to perform rectification associated with energy harvester 530 illustrated in FIG. 5).

In some cases, the rectification process in a diode barrier (e.g., Schottky diode or other diode) associated with performing energy harvesting can be classified into small signal operation and large signal operation. For example, large signal operation is associated with rectifying an input signal (e.g., a received downlink signal at an energy harvesting device that includes the diode) having a relatively large amplitude signal that causes the diode to operate in its resistive zone. Small signal operation (e.g., such as the example small signal operation illustrated in FIG. 6) can be associated with rectifying an input signal (e.g., or portion thereof) having a relatively small amplitude signal, such that the diode does not operate in its resistive zone.

For example, small signal operation of a rectifying process in a Schottky diode barrier may be associated with three different operating zones, as depicted in FIG. 6. In a first operating zone 610, the diode behavior may be approximated as quadratic. For example, in the first operating zone 610, the output signal of the diode may be proportional to the square of the input signal to the diode. In some cases, the first operating zone 610 may also be referred to as a square law zone. In a second operating zone 620, the diode behavior may become more affected by other contributions, and the relationship between the output-input signal of the diode may decrease from quadratic towards linear. In some cases, the second operating zone 620 may also be referred to as a transition zone. In a third operating zone 630, the output signal of the diode may be proportional to the input signal to the diode (e.g., a linear relationship between input and output signals of the diode) and no DC component is generated. The third operating zone 630 may also be referred to as a resistive zone.

Figure 7A:
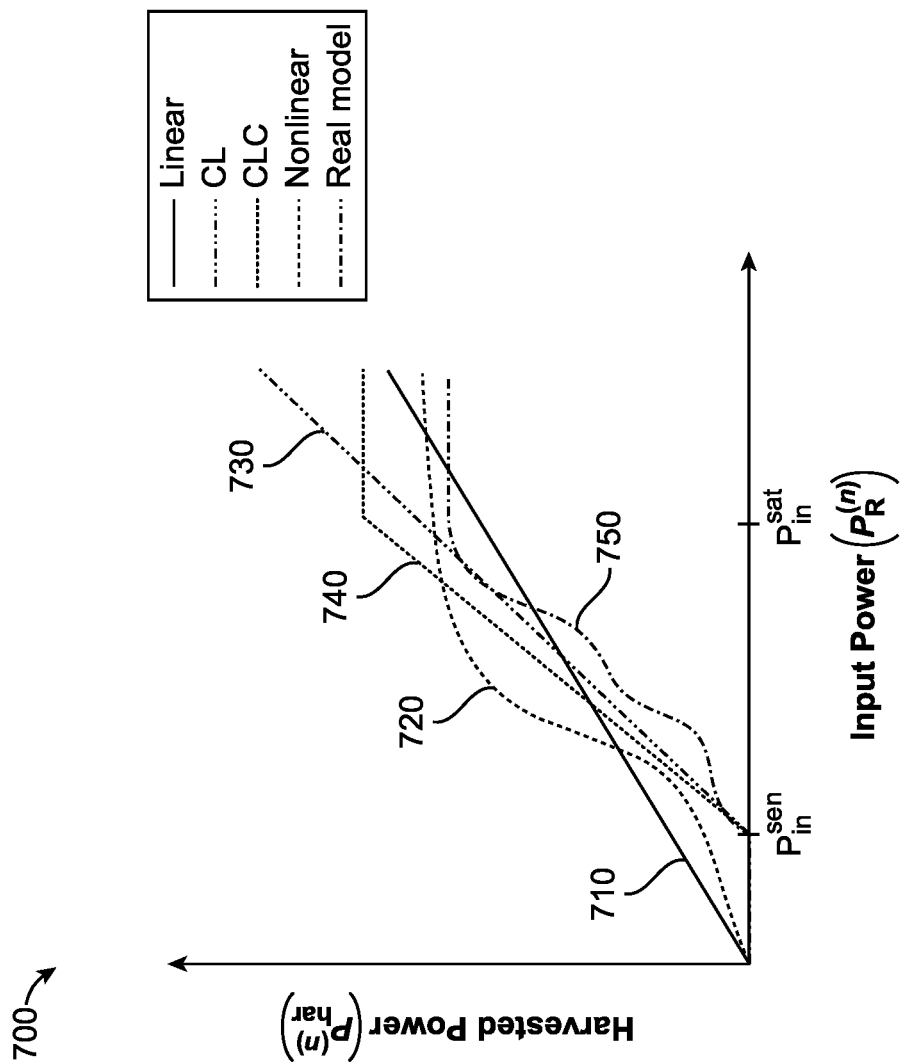
FIG. 7A is a diagram illustrating example energy harvesting characteristics between input power and harvested power, in accordance with some examples.

FIG. 7A is a diagram 700 illustrating examples of input power-harvested power conversion models that may be associated with various energy harvesting devices (e.g., such as the energy harvesting device 500 illustrated in the example of FIG. 5, above). Diagram 700 includes a first power conversion model 710, a second power conversion model 720, a third power conversion model 730, a fourth power conversion model 740, and a fifth power conversion model 750. In some aspects, different energy harvesting devices may be associated with different models between input power (e.g., the total RF energy or power of the portion of the received downlink signal provided to energy harvester 530 illustrated in FIG. 5) and harvested power (e.g., the RF energy or power that is harvested and output by energy harvester 530). In some aspects, the power conversion models 710-750 may be associated with passive, semi-passive, and/or active energy harvesting devices.

The first power conversion model 710 can be associated with a first type or category of energy harvesting devices. For example, energy harvesting devices having the first power conversion model 710 can provide harvested power as a continuous, linear, increasing function of the input RF power.

The second power conversion model 720 can be associated with a second type or category of energy harvesting devices. For example, energy harvesting devices having the second power conversion model 720 can provide harvested power as a continuous, non-linear, increasing function of the input RF power.

The third power conversion model 730 can be associated with a third type or category of energy harvesting device. For example, energy harvesting devices having the third power conversion model 730 can provide harvested power that is a continuous, linear, increasing function of the input RF power, given that the input RF power is above a sensitivity threshold ($P_{in}^{sen}$). The sensitivity threshold $P_{in}^{sen}$ can represent a minimum input RF power for which the energy harvesting device is able to perform harvesting (e.g., is able to harvest a non-zero amount of power). When the input RF power is below the sensitivity threshold ($P_{in}^{sen}$), the harvested power is zero.

The fourth power conversion model 740 can be associated with a fourth type or category of energy harvesting device. For example, energy harvesting devices having the fourth power conversion model 740 can provide harvested power that is a continuous, linear, increasing function of the input RF power, given that the input RF power is both above the sensitivity threshold $P_{in}^{sen}$ and is below a saturation threshold $P_{in}^{sat}$. As illustrated, the saturation threshold $P_{in}^{sat}$ is greater than the sensitivity threshold $P_{in}^{sen}$. When the input RF power is below the sensitivity threshold $P_{in}^{sen}$, the harvested power is zero. When the input RF power is above the saturation threshold $P_{in}^{sat}$, the harvested power output saturates (e.g., remains approximately constant for any input RF power above the saturation threshold).

The fifth power conversion model 750 can be associated with a fifth type or category of energy harvesting device. For example, for an input RF power between the sensitivity threshold $P_{in}^{sen}$ and the saturation threshold $P_{in}^{sat}$, energy harvesting devices having the fifth power conversion model 750 can provide harvested power that is a continuous, non-linear, increasing function of the input RF power.

Figure 7B:
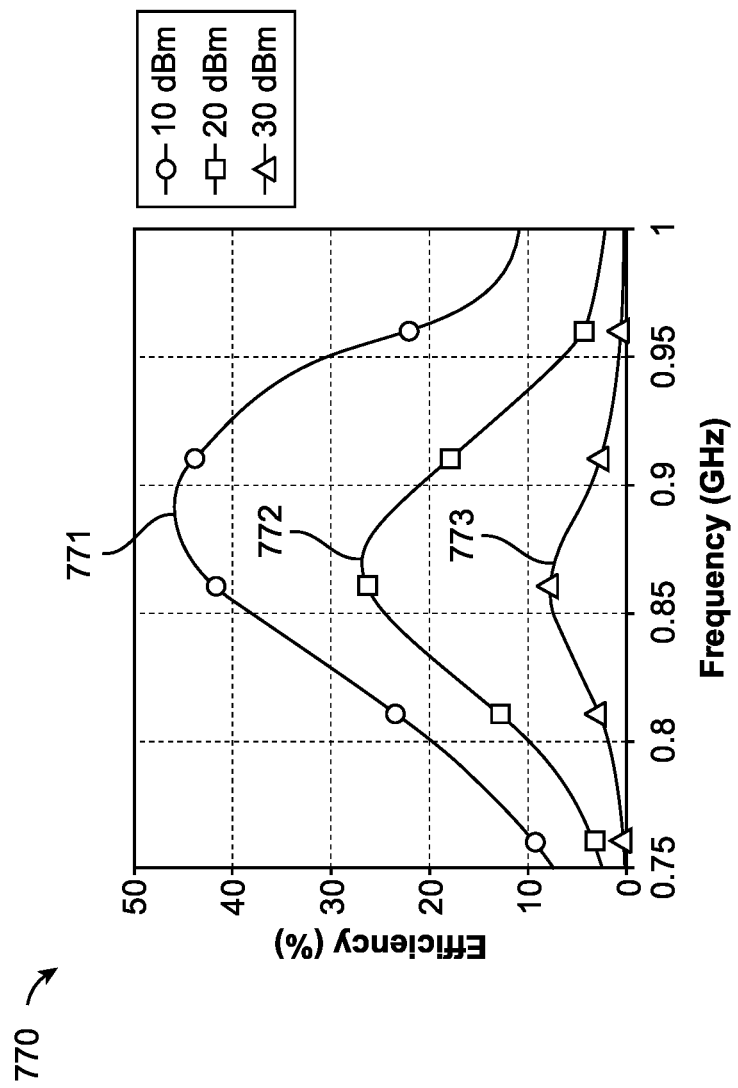
FIG. 7B is a diagram illustrating an example of energy conversion efficiency associated with different frequencies and input powers, in accordance with some examples.

In some examples, an efficiency of an energy harvesting device can be determined as a percentage of the input RF power that is converted into harvested power. FIG. 7B is a diagram 770 illustrating an example of energy conversion efficiency vs. frequency (e.g., of an input waveform to the energy harvesting device) for different input powers. For example, a first efficiency-frequency relationship 771 is shown for an input RF power of −10 dBm (decibel milliwatts), a second efficiency-frequency relationship 772 is shown for an input RF power of −20 dBm, and a third efficiency-frequency relationship 773 is shown for an input RF power of −30 dBm.

The three efficiency-frequency relationships 771, 772, 773 depicted in FIG. 7B may each be associated with an optimum operating frequency, or an optimum operating frequency band, for which the energy conversion efficiency of a corresponding energy harvesting device is maximized. For example, for an input RF power of −30 dBm, an energy harvesting device with the third energy conversion model 773 may maximize its energy conversion efficiency with an input RF waveform centered at a frequency of 0.86 GHz. In another example, for an input RF power of −20 dBm, an energy harvesting device with the second energy conversion model 772 may maximize its energy conversion efficiency with an input RF waveform centered at a frequency of 0.87 GHz. In another example, for an input RF power of −10 dBm, an energy harvesting device with the first energy conversion model 771 may maximize its energy conversion efficiency with an input RF waveform centered at a frequency of 0.89 GHz.

In some aspects, the efficiency of an energy harvesting device may vary based on the input RF power (e.g., the RF power of the downlink signal received at an antenna of the energy harvesting device) and the center frequency of the input RF waveform. For example, as illustrated in FIG. 7B, the maximum or peak efficiency of an energy harvesting device that receives a relatively low input RF power may be less than the maximum or peak efficiency of an energy harvesting device that receives a relatively high input RF power (e.g., at −30 dBm the peak efficiency of energy conversion model 773 is below 10%, at −20 dBm the peak efficiency of energy conversion model 772 is approximately 25%, and at −10 dBm the peak efficiency of energy conversion model 771 is approximately 45%). In some cases, conversion efficiency can decrease for frequencies that are greater than the optimum input center frequency and can decrease for frequencies that are less than the optimum input center frequency.

In some aspects, the conversion efficiency of an energy harvesting device may be associated with one or more energy conversion characteristics (e.g., also referred to as energy harvesting characteristics). For example, one or more characteristics may be indicative of a relationship between the conversion efficiency of an energy harvesting device and input frequency. In one illustrative example, an energy harvesting device may have an approximately constant conversion efficiency over a narrowband operating bandwidth. In such examples, the energy harvesting device can receive RF energy from a multi-sine downlink wave with uniform power distribution. In another illustrative example, an energy harvesting device with a wideband operating bandwidth may have a conversion efficiency that is a non-linear function of input frequency over the wideband. A wideband bandwidth can be larger than a narrowband bandwidth. In such examples, the energy harvesting device may receive RF energy based on Gaussian and/or raised-cosine filters being used in combination with (e.g., on top of) the multi-sine downlink wave described above for narrowband operating bandwidths. In some aspects, a wideband bandwidth can be an operating bandwidth (e.g., message bandwidth) of a communication channel that is greater than a coherence bandwidth of the channel.

In some aspects, the energy conversion efficiency of an energy harvesting device may vary continuously with the input RF power. For example, the energy conversion efficiency may be zero for input powers less than the sensitivity threshold ($P_{in}^{sen}$) (e.g., based on the harvested power being equal to zero when the input RF power is below the sensitivity threshold, and conversion efficiency=harvested power/input RF power). In some examples, the energy conversion efficiency of an energy harvesting device may vary over different input frequencies (e.g., as described above with respect to FIG. 7B) and may additionally vary over different input RF powers. For example, in some cases the energy conversion efficiency of an energy harvesting device may be approximately linear with input RF power, for input RF power values between the sensitivity threshold ($P_{in}^{sen}$) and a first input RF power value greater than $P_{in}^{sen}$. The energy conversion efficiency may increase linearly with the input RF power from and above $P_{in}^{sen}$. At input RF powers beyond the linear conversion efficiency zone, the energy conversion efficiency of the energy harvesting device may increase and/or decrease non-linearly with further increases in input RF power. In some examples, the energy conversion efficiency may include one or more additional zones of linear increase (e.g., and/or linear decrease) with input RF power, in addition to an initial linear conversion efficiency zone beginning at the sensitivity threshold $P_{in}^{sen}$.

In some cases, existing approaches to wireless energy harvesting (e.g., such as energy harvesting associated with RFID tags and/or RFID devices) are associated with short-range implementations. For example, RFID devices (and/or passive IoT devices implementing RFID-based communications and energy harvesting) may support wireless energy harvesting and backscatter modulation over distances of 10 meters or less. For transmitters and energy harvesting devices that are separated by greater than 10 meters, wireless energy harvesting and backscatter modulation may be difficult to implement based on insufficient link budget issues.

As mentioned previously, there is a need for systems and techniques that can be used to provide improved wireless energy harvesting and/or backscatter modulation-based communications between an energy harvesting device (e.g., passive, semi-passive, or active IoT device, etc.) and a network node or transmitter (e.g., gNB or base station). There is also a need for systems and techniques that can be used to provide wireless energy harvesting and backscatter modulation-based communications over a greater range than existing RFID-based approaches. For example, passive or semi-passive IoT devices may include one or more sensors and can be utilized to perform tasks such as asset management, logistics tracking, warehousing, manufacturing, etc. In such examples, the passive (or semi-passive) IoT device(s) may often be located at distances greater than 10 meters away from a corresponding base station or transmitter.

As will be discussed in greater depth below, the systems and techniques described herein can be used to determine control information associated with a channel between an energy transmitter (e.g., gNB, base station, etc.) and an energy receiver (e.g., energy harvesting device, passive or semi-passive IoT device, etc.). For example, the system and techniques can be used to determine control information associated with a wideband channel based on transmitting an RF signal in each respective sub-band of a plurality of sub-bands included in the wideband channel. Each RF signal can be backscatter modulated (e.g., reflected) by the energy receiver. In one illustrative example, the backscatter RF signals can be frequency shifted into a sub-band that is different than the sub-band in which the corresponding RF signal was transmitted by the energy transmitter. For example, the energy receiver (e.g., energy harvesting device) can frequency shift an input RF signal from a first sub-band to a second sub-band. In some examples, the first and second sub-bands can be adjacent. In some cases, the energy harvesting device can apply a cyclic shift to generate the frequency shifted backscatter reflection(s). Based on receiving a frequency shifted backscatter RF signal in each sub-band of the wideband bandwidth, the energy transmitter (e.g., base station, gNB, etc.) can determine control information associated with the channel between the energy transmitter and the energy receiver, as will be described in greater depth below. For example, the systems and techniques can determine control information associated with the wideband bandwidth based on a plurality of backscatter RF signals. In some cases, the systems and techniques can determine control information associated with the wideband bandwidth based on jointly processing the respective backscatter RF signals of the plurality of RF signals. In some aspects, the control information can be Channel State Information (CSI).

FIG. 8A is a diagram illustrating an example of a wideband bandwidth 800*a* that includes a plurality of sub-bands 812, 814, 816. In some examples, the wideband bandwidth 800*a* can represent a wideband bandwidth available for wireless communications between an energy transmitter (e.g., base station, gNB, etc.) and an energy harvesting device (e.g., energy receiver). In one illustrative example, an energy transmitter (ET) can divide a given wideband bandwidth into n sub-bands. For example, the ET can divide wideband bandwidth 800*a* into the three sub-bands 812 (e.g., $B_0$), 814 (e.g., $B_1$), 816 ($B_2$). In some cases, the n sub-bands can be non-overlapping and/or equal in size (e.g., the bandwidth of each of the n sub-bands can be wideband bandwidth/n). In some aspects, a given wideband bandwidth can be divided into n sub-bands wherein n is greater than or equal to three.

In one illustrative example, the ET can transmit n wideband signals in the n sub-bands. For example, as illustrated in FIG. 8B, an ET 840 can transmit n wideband signals by transmitting a respective wideband signal in each sub-band included in the n sub-bands. A first transmitted signal 842 (e.g., $x_0$) can be transmitted using a first sub-band. For example, the signal $x_0$ can be transmitted in the first sub-band $B_0$ illustrated in FIG. 8A). A second transmitted signal 844 (e.g., $x_1$) can be transmitted using a second sub-band (e.g., the second sub-band $B_1$ illustrated in FIG. 8A). A third transmitted signal 848 (e.g., $x_{n-1}$ (e.g., $x_2$ for n=3)) can be transmitted using a third sub-band (e.g., the third sub-band $B_2$ illustrated in FIG. 8A), etc.

In some aspects, ET 840 can transmit the n wideband signals (e.g., $x_0, x_1, \ldots, x_{n-1}$) in TDM fashion. Each wideband signal included in the n wideband signals can be transmitted in a respective one of the n sub-bands separately over time. For example, the first wideband signal $x_0$ can be transmitted by ET 840 at a first time to, the second wideband signal $x_1$ can be transmitted by ET 840 at a second time $t_1, \ldots$, and the nth wideband signal $x_{n-1}$ can be transmitted by ET 840 at an nth time $t_{n-1}$. In some aspects, each of the n wideband signals can be the same. For example, $x_0=x_1=x_{n-1}=x$. In some cases, one or more (or all) of the n wideband signals can be different. In some examples, ET 840 can transmit the n wideband signals to an energy receiver (ER). For example, ET 840 can transmit the n wideband signals to ER 870. In some examples, ET 840 can broadcast the n wideband signals and the n wideband signals may be received by one or more ERs (e.g., including ER 870).

An energy receiver (ER) 870 can receive each wideband signal at a corresponding time and in the corresponding sub-band (e.g., the sub-band in which the ET 840 transmitted the respective wideband signal). The energy receiver can be an energy harvesting device, a passive or semi-passive IoT device, an active IoT device, and/or other UE or wireless communication device that includes a backscatter transmitter. As illustrated in FIG. 8B, the ER 870 can backscatter (e.g., reflect) each of the wideband signals $x_n$ received from the ET 840. In one illustrative example, the ER 870 can introduce a pre-determined frequency shift to the backscatter RF signal.

Each backscatter RF signal (e.g., of a plurality of backscatter RF signals generated by ER 870) can be associated with a respective RF signal. For example, a backscatter RF signal can be associated with the respective RF signal that ER 870 backscatter modulates to generate the backscatter RF signal. For example, the ER 870 can receive the first wideband signal $x_0$ in a first sub-band (e.g., $B_0$) and transmit a backscatter RF signal $y_0$ that is frequency shifted to a different sub-band (e.g., $B_1$). The backscatter RF signal $y_0$ can be associated with the first wideband signal $x_0$. ER 870 can subsequently receive (e.g., based on the ET 840 using TDM to transmit the wideband signals $x_n$) the second wideband signal $x_1$ in a second sub-band (e.g., $B_1$) and transmit a backscatter RF signal $y_1$ that is frequency shifted to a different sub-band (e.g., $B_1$). The backscatter RF signal $y_1$ can be associated with the second wideband signal $x_1$. ER 870 can subsequently receive the third wideband signal $x_{n-1}$ in a third sub-band (e.g., $B_2$) and transmit a backscatter RF signal $y_{n-1}$ that is frequency shifted to a different sub-band (e.g., $B_0$). The backscatter RF signal $y_{n-1}$ can be associated with the third wideband signal $x_{n-1}$.

In one illustrative example, the frequency shift introduced by ER 870 can be based on a configuration information 841 received from ET 840 (e.g., transmitted by ET 840). In some cases, configuration information 841 can be transmitted by ET 840 (e.g., and received by ER 870) prior to the transmission of the n wideband signals $x_n$ by ET 840. For example, configuration information 841 can be received by ER 870 before ET 840 transmits the first wideband signal $x_0$. The configuration information 841 can be indicative of one or more frequency shifts associated with one or more ERs (e.g., including ER 870). For example, ET 840 can be associated with a plurality of ERs (e.g., including ER 870) and can generate and transmit configuration information 841 that indicates frequency shift information for each respective ER included in the plurality of ERs. In some aspects, the configuration information 841 can include an identifier for each respective ER included in the plurality of ERs, wherein each identifier is associated with a frequency shift to be applied by the corresponding ER (e.g., the corresponding ER identified by the respective identifier included in the configuration information 841). In some cases, some (or all) of the ERs included in the plurality of ERs may apply the same frequency shift. In some examples, some (or all) of the ERs included in the plurality of ERs may apply different frequency shifts.

Based on the frequency shift information indicated by the configuration information 841, ER 870 can generate the respective frequency shifted backscatter reflection signal $y_n$ for each wideband input signal $x_n$ that is received by ER 870. Based on each backscatter reflection $y_n$ being frequency shifted to a sub-band different than the sub-band in which the corresponding input signal $x_n$ was transmitted by ET 840, the ET 840 can receive the backscatter reflections $y_n$ without interference from the corresponding transmitted signal $x_n$. For example, if ET 840 transmits the first wideband signal $x_0$ using first sub-band $B_0$ and receives the corresponding frequency-shifted backscatter reflection $y_0$ using second sub-band $B_1$, ET 840 can receive $y_0$ without interference from the transmission of $x_0$.

As will be described in greater depth below, based on receiving a corresponding frequency shifted backscatter RF signal $y_n$ (e.g., the backscatter RF signals 872, 874, ..., 878 illustrated in FIG. 8B) for each of the wideband sub-band signals $x_n$ (e.g., the transmitted signals 842, 844, ..., 848 illustrated in FIG. 8B), the ET 840 can estimate CSI of the channel between ET 840 and ER 870. Based on the wideband CSI estimation, the ET 840 can generate and transmit an energy signal 850 using an optimized channel selection, frequency selection, and/or spatial beamforming that is determined based on the estimated wideband CSI. In some aspects, an "energy signal" (e.g., such as energy signal 850) may also be referred to herein as a signal for energy harvesting and/or an RF signal for energy harvesting. For example, the energy signal 850 can be used to perform energy harvesting (e.g., an energy receiver, such as ER 870, can receive the RF signal for energy harvesting 850 and perform energy harvesting based on receiving the RF signal for energy harvesting 850). By matching the energy signal 850 to the wideband CSI estimation, the ET 840 can generate an energy signal with an improved transmission range and/or an improved energy harvesting efficiency at the corresponding ER 870.

Figure 9:
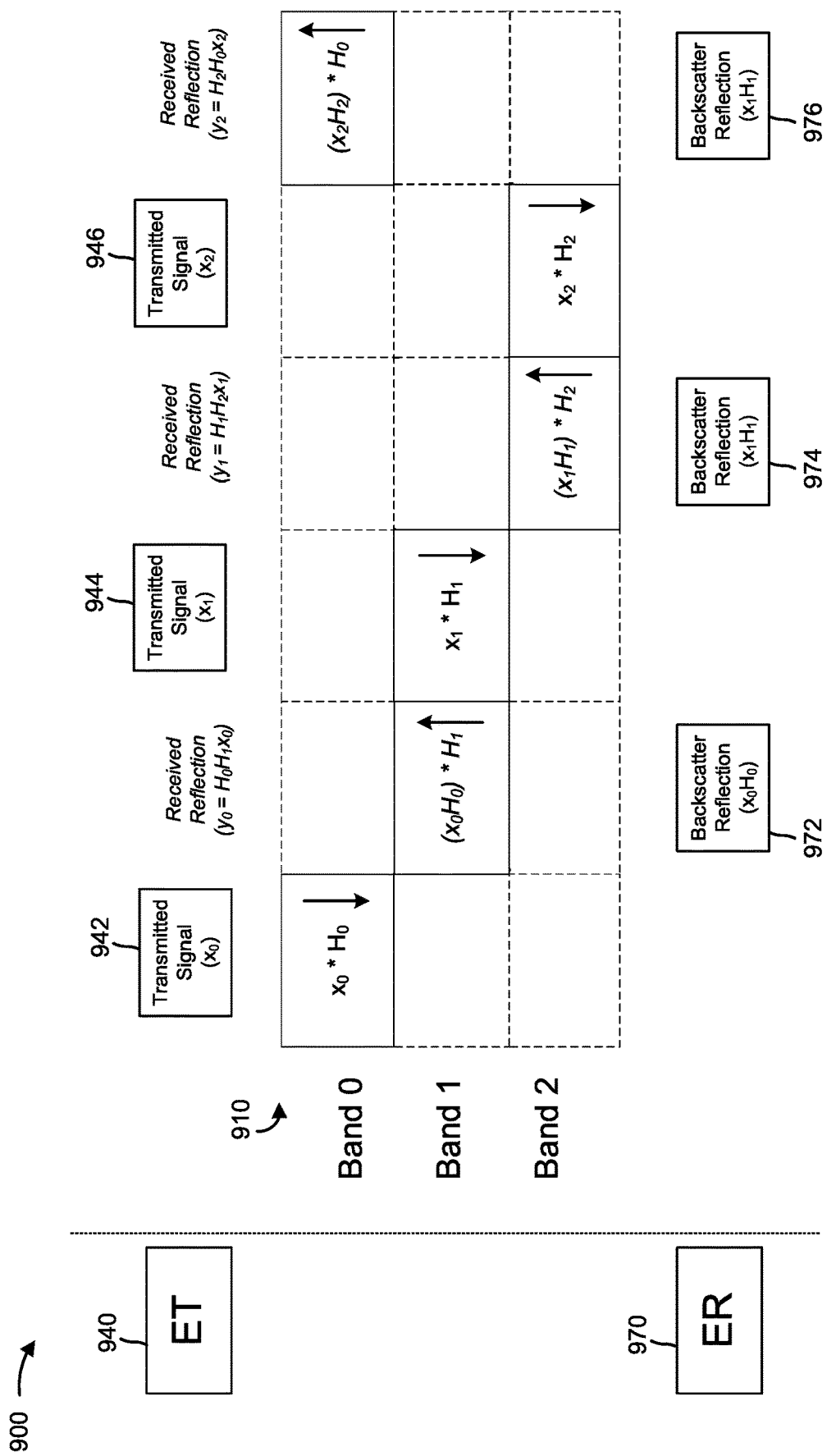
FIG. 9 is a diagram illustrating an example time-frequency grid corresponding to communications between an energy transmitter and an energy receiver for determining control information associated with a wideband bandwidth, in accordance with some examples.

FIG. 9 is a diagram illustrating an example time-frequency grid 900 corresponding to communications between an energy transmitter (ET) 940 and an energy receiver (ER) 970 for determining control information (e.g., CSI) associated with a wideband bandwidth, in accordance with some examples. In some aspects, ET 940 and ER 970 can be the same as or similar to the ET 840 and the ER 870, respectively, that are illustrated in FIG. 8B and described above. In some aspects, the transmitted signals 942, 944, 946 illustrated in FIG. 9 can be the same as the transmitted signals 842, 844, 848 illustrated in FIG. 8B (e.g., the transmitted signals $x_0$, $x_1$, $x_{n-1}/x_2$ can be the same in FIGS. 8B and 9). In some examples, the frequency shifted backscatter RF signals 972, 974, 976 illustrated in FIG. 9 can be the same as the frequency shifted backscatter RF signals 872, 874, 878 illustrated in FIG. 8B (e.g., the frequency shifted backscatter RF signals $y_0$, $y_1$, $y_{n-1}/y_2$ can be the same in FIGS. 8B and 9).

The time-frequency grid 900 illustrated in FIG. 9 includes a plurality of time-frequency resources. For example, time is represented on the horizontal axis of time-frequency grid 900 and frequency is represented on the vertical axis of time-frequency grid 900. The sub-bands included in the wideband bandwidth between ET 940 and ER 970 can each be associated with a different set of one or more frequency resources. For example, the first sub-band $B_0$ is associated with the top row of frequency resources included in time-frequency grid 900, the second sub-band $B_1$ is associated with the middle row of frequency resources included in time-frequency grid 900, and the third sub-band $B_2$ is associated with the bottom row of frequency resources included in time-frequency grid 900.

In one illustrative example, the signal received at ET 940 after the backscattering reflection performed by ER 970 can be a multiplication of the transmitted signal with the channel coefficients of the forward channel and the channel coefficients of the backward channel. The forward and backward channel coefficients can be different based on the input signal $x_n$ from ET 940 to ER 970 being transmitted using a different sub-band than the frequency shifted backscatter reflection signal $y_n$ from ER 970 to ET 940.

For example, the first transmitted signal $x_0$ can be transmitted from ET 940 to ER 970 using the first sub-band $B_0$ as the forward channel. $B_0$ may be associated with channel coefficients $H_0$ (and the second sub-band $B_1$ may be associated with channel coefficients $H_1$, the third sub-band $B_2$ may be associated with channel coefficients $H_2$, etc.). As illustrated in FIG. 9, the ER 970 receives $x_0^*H_0$, which represents the signal transmitted by ET 940 multiplied by the corresponding channel coefficients of the forward channel (e.g., sub-band of the wideband bandwidth) used by ET 940 for the transmission.

ER 970 then frequency shifts and backscatters the received signal $x_0H_0$ using the second sub-band $B_1$ as the backward channel. The received backscatter RF signal at ET 940 (e.g., $y_0$) is $x_0H_0H_1$, the received signal (e.g., $x_0H_0$) multiplied by the backward channel coefficients (e.g., $H_1$). As illustrated in FIG. 9, ER 970 may implement a frequency shift of one sub-band. In some aspects, ER 970 can frequency shift a backscatter RF signal to an adjacent sub-band of a particular sub-band associated with a particular RF signal (e.g., the RF signal backscattered as the backscatter RF signal). For example, ER 970 can frequency shift a backscatter RF signal to an adjacent sub-band of the sub-band used to transmit (e.g., by ET 940) and receive (e.g., by ER 970) the input RF signal that is being backscattered. For example, ER 970 can generate each frequency shifted backscatter RF signal $y_n$ by frequency shifting the corresponding input signal $x_n$ into the adjacent sub-band. In some cases, a cyclic frequency shift can be performed at the edge sub-band(s) of the wideband bandwidth (e.g., frequency shift from $B_2$ to $B_0$ or vice versa). A cyclic frequency shift may also be referred to as a circular frequency shift. For example, ER 970 can frequency shift a backscatter signal to a cyclic shifted sub-band of a particular sub-band associated with a particular RF signal (e.g., the RF signal backscattered as the backscatter signal).

Based on a similar multiplication between each transmitted signal and the corresponding forward and backward channel coefficients, ET 940 can receive the frequency shifted backscatter RF signals generated and transmitted by ER 970 as $y_0 = H_0 H_1 x_0$; $y_1 = H_1 H_2 x_1$; and $y_2 = H_2 H_0 x_2$. For example, the first frequency shifted backscatter RF signal $y_0$ can be associated with the first input signal $x_0$, the second frequency shifted backscatter RF signal $y_1$ can be associated with the second input signal $x_1$, and the third frequency shifted backscatter RF signal $y_2$ can be associated with the third input signal $x_2$. In some examples, the transmitted signal on each sub-band can be the same. For example, ET 940 can transmit the same wideband signal x in each of the n sub-bands, such that $x_0 = x_1 = x_2 = x$. For example, the frequency domain allocation pattern used to transmit within each of the n sub-bands can be the same (e.g., a quantity of sub-carriers and an allocation of signals to the sub-carriers may be the same for each of the n sub-bands, with each of the n sub-bands using a different sub-carrier frequency). When the same wideband signal is transmitted in each sub-band, ET 940 can receive the frequency shifted backscatter reflection signals generated and transmitted by ER 970 as $y_0 = H_0 H_1 x$; $y_1 = H_1 H_2 x$; and $y_2 = H_2 H_0 x$.

Figure 10:
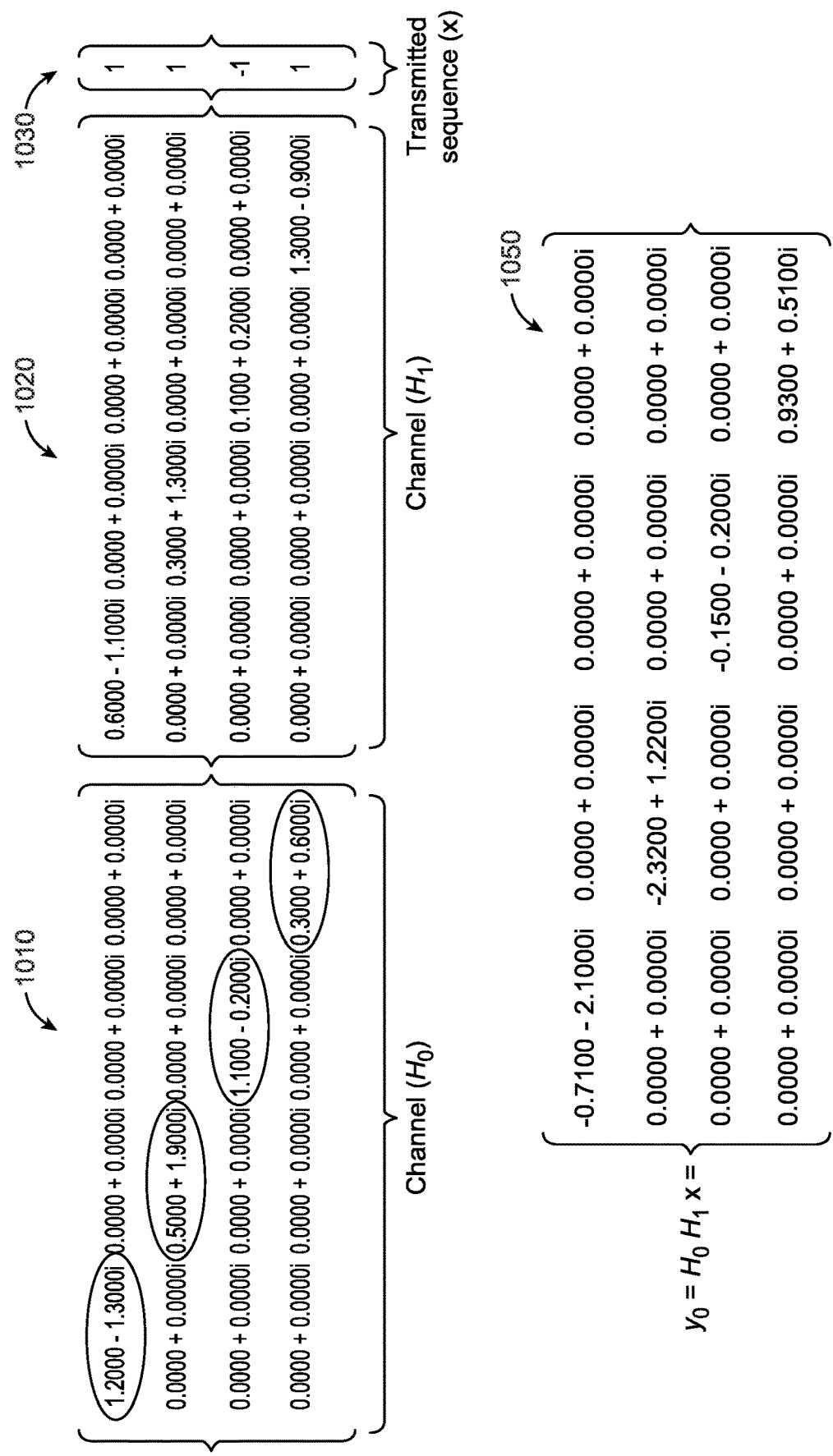
FIG. 10 is a diagram illustrating an example of channel coefficients associated with sub-bands of a wideband bandwidth, in accordance with some examples.

$H_0$, $H_1$, and $H_2$ can be diagonal matrices with diagonal entries indicative of the channel coefficients of the corresponding channel (e.g., the corresponding sub-band $B_0$, $B_1$, $B_2$ included in the wideband bandwidth). For example, FIG. 10 is a diagram illustrating an example of the channel coefficients associated with the sub-bands included in a wideband bandwidth. In the example of FIG. 10, each sub-band has four sub-carriers, although it is noted that a greater or lesser quantity of sub-carriers may also be utilized per band and/or per sub-band. For example, in some cases the quantity of sub-carriers included in each sub-band can be 156, in which case the channel coefficient matrices $H_n$ can be given as 156×156 matrices with the channel gain associated with each sub-carrier indicated by the corresponding one of the 156 diagonal elements of $H_n$.

A first diagonal matrix 1010 can represent the channel coefficients $H_0$ associated with the first sub-band $B_0$ and a second diagonal matrix 1020 can represent the channel coefficients $H_1$ associated with the second sub-band $B_1$. As illustrated, the non-diagonal entries of matrices 1010, 1020 are zero, with the diagonal entries representing the channel coefficients of the respective sub-bands $B_0$ and $B_1$. The transmitted input sequence x is indicated at 1030.

The frequency shifted backscatter reflection signal $y_0$ received at ET 940 in response to transmitting the first wideband signal 942 can be given as $y_0 = H_0 H_1 x$ (e.g., as described above). As illustrated in FIG. 10, $y_0$ can comprise the matrix multiplication of the $H_0$ matrix 1010, the $H_1$ matrix 1020, and the transmitted sequence (e.g., x) matrix/vector 1030. The resulting $y_0$ matrix 1050 includes non-zero diagonal entries and zero-valued non-diagonal entries.

Assuming that the channel reciprocity and the reflection coefficient of the ER 970 is known, the ET 940 can use the frequency shifted backscatter RF signals $y_0$, $y_1$, $y_2$ to determine the channel coefficient matrices $H_0$, $H_1$, $H_2$ for the three sub-bands $B_0$, $B_1$, $B_2$ included in the wideband bandwidth. In some aspects, the channel coefficient matrices may also be referred to as "control information" associated with the wideband bandwidth. In some examples, the channel coefficient matrices may additionally, or alternatively, be referred to as CSI associated with the wideband bandwidth. In some examples, the control information associated with the wideband bandwidth can be determined based on a plurality of backscatter RF signals. For example, the channel coefficient matrices $H_0$, $H_1$, $H_2$ can be determined based on the plurality of backscatter RF signals $y_0$, $y_1$, $y_2$. In some cases, the control information associated with the wideband bandwidth (e.g., the channel coefficient matrices $H_0$, $H_1$, $H_2$) can be determined based on jointly processing the plurality of backscatter RF signals (e.g., $y_0$, $y_1$, $y_2$). For example, the ET 940 can determine the channel coefficients of the channel $H_0$ (e.g., the channel coefficients associated with first sub-band $B_0$) as $$H_0 = \frac{y_0 y_2}{y_1}.$$

The remaining channel coefficients $H_1$ and $H_2$ can be determined successively based on $H_0$.

For example, the ET 940 can determine the channel coefficients of the channel $H_2$ (e.g., the channel coefficients associated with third sub-band $B_2$) as $$H_2 = \frac{y_2}{H_0}$$

and can determine the channel coefficients of the channel $H_1$ (e.g., the channel coefficients associated with second sub-band $B_1$) as $$H_1 = \frac{y_1}{H_2}.$$

In some aspects, for a given wideband bandwidth between ET 940 and ER 970 that is divided into n sub-bands (wherein n is odd), ET 940 can transmit each wideband signal x using a sub-band $B_m$ and can receive (e.g., from ER 970) each frequency shifted backscatter reflection signal y using the sub-band $B_{mod(m+1,n)}$. The channel coefficients $H_0$ associated with the first sub-band $B_0$ can be determined as $$H_0 = \frac{y_0 y_2 y_4 \cdots y_{n-1}}{y_1 y_3 y_5 \cdots y_{n-2}}$$

and the remaining channel coefficients $H_1, \ldots, H_{m-1}$ associated with the remaining sub-bands $B_1, \ldots, B_{m-1}$ can be determined successively from $H_0$ as described above.

In some examples, the CSI information (e.g., $H_0, \ldots, H_{m-1}$) can be determined using only the frequency shifted backscatter reflected signals $y_0, \ldots, y_{n-1}$ received at ET 940 from ER 970. In some aspects, the ER 970 can transmit the backscatter reflected signals y without decoding the corresponding input wideband signal x. For example, ER 970 can frequency shift and reflect the incoming signal without performing decoding of the incoming signal.

In one illustrative example, the ET 940 can implement full duplex operation by transmitting a wideband signal on a first sub-band and receiving a reflection of a wideband signal on a different sub-band. For example, the wideband signal $x_0$ transmitted on $B_0$ by ET 940 and the frequency shifted backscatter reflected signal $y_0$ received on $B_1$ by ET 940 can overlap at least partially in time. Based on $x_0$ and $y_0$ being on different sub-bands of the wideband bandwidth between ET 940 and ER 970, self-interference can be minimized or avoided during full duplex operation by ET 940.

In some examples, the systems and techniques can be used to determine control information (e.g., CSI) of multiple ERs associated with a given ET. For example, ET 940 can be associated with a plurality of ERs that are the same as or similar to ER 970. In one illustrative example, ET 940 can determine CSI for multiple ERs based on multiplexing of the frequency shifted backscatter RF signals from each respective one of the multiple ERs. For example, ET 940 can transmit a wideband signal x to each ER included in the multiple ERs using a given one of the sub-bands. Each ER can apply a different frequency shift such that the corresponding backscatter RF signal y transmitted by each ER is frequency shifted to a different sub-band.

In one illustrative example, ET 940 can transmit a wideband signal x using the first sub-band $B_0$ to a first and second ER 970. The first ER can be configured to apply a frequency shift (e.g., cyclic frequency shift) of one sub-band, and transmits a backscatter reflected signal using sub-band $B_1$. The second ER can be configured to apply a different frequency shift than the first ER. For example, the second ER can apply a frequency shift (e.g., cyclic frequency shift) of two sub-bands, and transmits a backscatter reflected signal using sub-band $B_2$.

In some aspects, the systems and techniques described herein can be used to multiplex a quantity of ERs up to the quantity of sub-bands (e.g., n) minus one. For example, if ET 940 divides a wideband bandwidth into n different sub-bands, ET 940 can multiplex n−1 ERs onto the wideband bandwidth. In the example of FIGS. 8 and 9, n=3 and ET 940 can multiplex up to 3−1=2 different ERs together on the wideband bandwidth. For n=4 sub-bands, ET 940 can multiplex up to 4−1=3 different ERs together on the wideband bandwidth, etc.

In some examples, the different frequency shifts to be applied by multiple ERs (e.g., multiplexed ERs) can be indicated using the configuration information 841 illustrated in FIG. 8B. When multiple ERs are multiplexed onto the wideband bandwidth, the ER 940 can jointly determine the individual channel estimates for each ER as described above. For example, based on each ER of the multiple ERs applying a different frequency shift when backscatter reflecting each of the n wideband signals x transmitted by ET 940, ET 940 can distinguish the respective reflected signals y transmitted by the multiple ERs at each time step.

In some examples, based on determining the control information (e.g., CSI) associated with the wideband bandwidth, an ET can generate and transmit an adaptive multisine waveform determined using the CSI. For example, the energy signal 850 illustrated in FIG. 8 (e.g., also referred to as an RF signal for energy harvesting) can be an adaptive multisine waveform generated using the CSI determined for or otherwise associated with $H_0$, $H_1$, $H_2$. The adaptive multisine waveform can be generated by adjusting (e.g., using ET 840) the allocated power levels for the multiple sine frequencies based on the known channel gains. In some cases, the allocated power levels (e.g., respective transmission power levels) associated with each sine frequency can be determined based on CSI and/or channel gain information associated with a channel used to transmit each sine frequency. For example, a transmission power level associated with a first sine frequency (e.g., transmitted using a first channel) can be determined based on a corresponding CSI and/or channel gain information determined for the first channel, etc. For example, the ET 840 can generate energy signal 850 as an adaptive single sine waveform by allocating all of the total transmission power to a single sine wave with the frequency associated with the largest channel gain as determined from the CSI (e.g., $H_0$, $H_1$, $H_2$). In some examples, ET 840 can allocate the available transmission power across multiple sine wave frequencies proportional to the respective channel gains of each frequency (e.g., matched filter), as determined from the CSI (e.g., $H_0$, $H_1$, $H_2$). In examples where the ET multiplexes multiple ERs onto the wideband bandwidth, the ET can generate energy signal 850 by selecting the channel (e.g., sub-band or frequency) that optimizes and/or maximizes the average energy signal efficiency over all of the multiple ERs or by selecting a channel that optimizes and/or maximizes the average energy signal efficiency over the set of ERs (included in the multiple ERs) having the lowest channel gains.

As described above, in some examples wherein a wideband bandwidth includes n different sub-bands, an ET can multiplex up to (n−1) different ERs onto the wideband bandwidth. For example, the ET may transmit a signal x using one of the n sub-bands, with the remaining n−1 sub-bands being available for an ER to frequency shift a backscatter reflection of signal x. In such examples, each of the remaining n−1 sub-bands can support the multiplexing of a single ER.

In one illustrative example, a quantity of ERs that can be multiplexed onto the wideband bandwidth may be increased by further dividing each sub-band into multiple physical resource groups (PRGs) that each include m sub-carriers. Multiple ERs can be multiplexed onto a single sub-band by using the sub-band shift described above (e.g., shifting a received signal x by one or more sub-bands) and by using a relatively small sub-carrier shift within the sub-band (e.g., shifting the received signal x by one or more sub-carriers within each PRG included in the sub-band). As will be described in greater depth below, the use of a sub-band frequency shift within the wideband bandwidth between an ET and an ER and a sub-carrier frequency shift within each sub-band can be utilized to multiplex up to (n−1)*m different ERs onto the wideband bandwidth.

Figure 11:
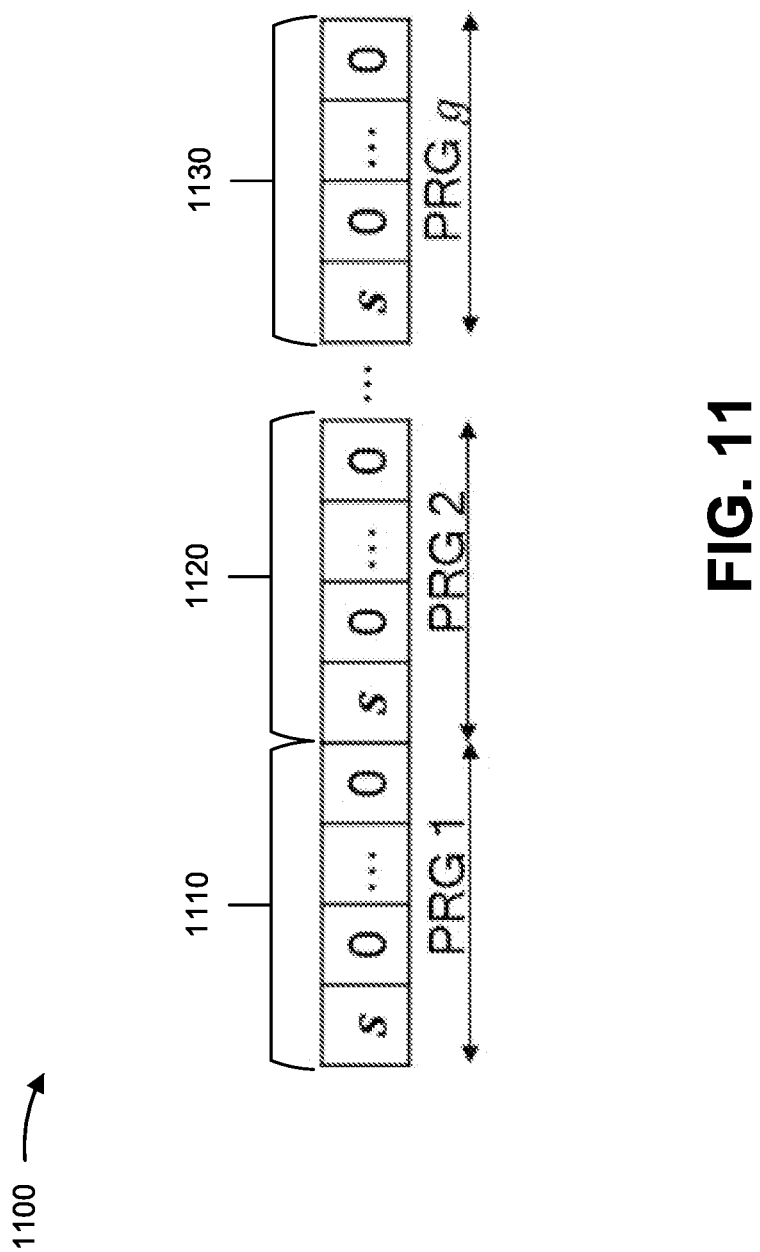
FIG. 11 is a diagram illustrating an example of a sub-band divided into multiple physical resource groups (PRGs), in accordance with some examples.

FIG. 11 is a diagram illustrating an example of a signal allocation in a single sub-band 1100 that includes multiple PRGs each including m sub-carriers. The single sub-band 1100 can be a sub-band included in a wideband bandwidth between an ET and one or more ERs. For example, sub-band 1100 can be the same as or similar to one or more (or all) of the sub-bands $B_0$, $B_1$, $B_2$, ..., $B_{n-1}$ described above with respect to FIGS. 8-10.

In some aspects, the PRGs can be selected or determined such that the channel variations in each PRG are relatively small. In some examples, each sub-band included in a wideband bandwidth between an ET and one or more ERs can be divided to include g PRGs. For example, sub-band 1100 includes a first PRG 1110 (e.g., "PRG 1"), a second PRG 1120 (e.g., "PRG 2"), . . . , and a gth PRG 1130 (e.g., "PRG g"). Each PRG can include the same quantity, m, of sub-carriers.

A signal transmitted using sub-band 1100 (e.g., the signal x or $x_n$ transmitted by the ET, or the frequency shifted backscatter reflection signal y transmitted by an ER) can be transmitted on each PRG included in sub-band 1100. For example, a signal transmitted using sub-band 1100 can be transmitted on one sub-carrier in each of the g PRGs of the sub-band (e.g., to transmit on sub-band 1100, an ET or an ER transmits g signals on g different sub-carriers within the sub-band 1100).

In some aspects, a signal transmitted using sub-band 1100 is transmitted using the same sub-carrier (e.g., same sub-carrier position) within each of the g PRGs included in sub-band 1100. For example, as illustrated in FIG. 11, a signal s can be transmitted using the first sub-carrier of PRG 1, using the first sub-carrier of PRG 2, . . . , and using the first sub-carrier of PRG g. A signal transmitted on a sub-band that includes g PRGs can be transmitted using g different sub-carriers.

In one illustrative example, an ER can frequency shift a received signal $x_0$ received in a first sub-band $B_0$ using a relatively large frequency shift of one or more sub-bands (e.g., shift the backscatter reflection $y_0$ to $B_1$, $B_2$, . . . , or $B_{n-1}$), as described above with respect to FIGS. 8A-9. An ER can additionally perform a relatively small frequency shift of one or more sub-carriers within each PRG.

For example, a first ER can receive the sub-band signal 1100 depicted in FIG. 11 on sub-band $B_0$ and perform a relatively large frequency shift to sub-band $B_1$ (or sub-band $B_2$, . . . , $B_{n-1}$). The frequency shifted signal in sub-band $B_1$ will utilize the same sub-carrier positioning within each PRG as the originally received signal did in sub-band $B_1$. For example, the signal received on sub-band $B_0$ can be received on the first sub-carrier of each PRG within sub-band $B_0$, and can be frequency shifted to the first sub-carrier of each PRG within sub-band $B_1$.

An additional ER can receive the same signal on the first-subcarrier of each PRG within sub-band $B_0$ and can apply a relatively large frequency shift of one or more sub-bands (e.g., from $B_0$ to $B_1$) and can additionally apply a relative small frequency shift of one or more sub-carriers (e.g., from the first sub-carrier of each PRG to the second sub-carrier of each PRG).

In some aspects, the process described above for the relatively small sub-carrier shift can be repeated until the sub-carriers of each PRG in the frequency shifted sub-band are fully saturated (e.g., a frequency shifted signal s is presented on each sub-carrier included in the frequency shifted sub-band). For example, the small frequency shift within the PRG can range from 0 to $(m-1)\Delta f$, where $\Delta f$ is the sub-carrier spacing. If m=4 (e.g., each PRG included in each sub-band includes four sub-carriers), a given sub-band can be used to multiplex up to m different ERs.

Continuing in the example above, for m=4, a signal x transmitted on the first sub-carrier of each PRG in $B_0$ can be shifted by a first ER to the first sub-carrier of each PRG in $B_1$, can be shifted by a second ER to the second sub-carrier of each PRG in $B_1$, can be shifted by a third ER to the third sub-carrier of each PRG in $B_1$, and can be shifted by a fourth ER to the fourth sub-carrier of each PRG in $B_1$. By saturating (e.g., transmitting a signal on) each sub-carrier available across the n sub-bands of the wideband bandwidth between an ET and a plurality of ERs, the quantity of ERs that can be multiplexed onto the wideband bandwidth can be increased to $(n-1)*m$.

Figure 12:
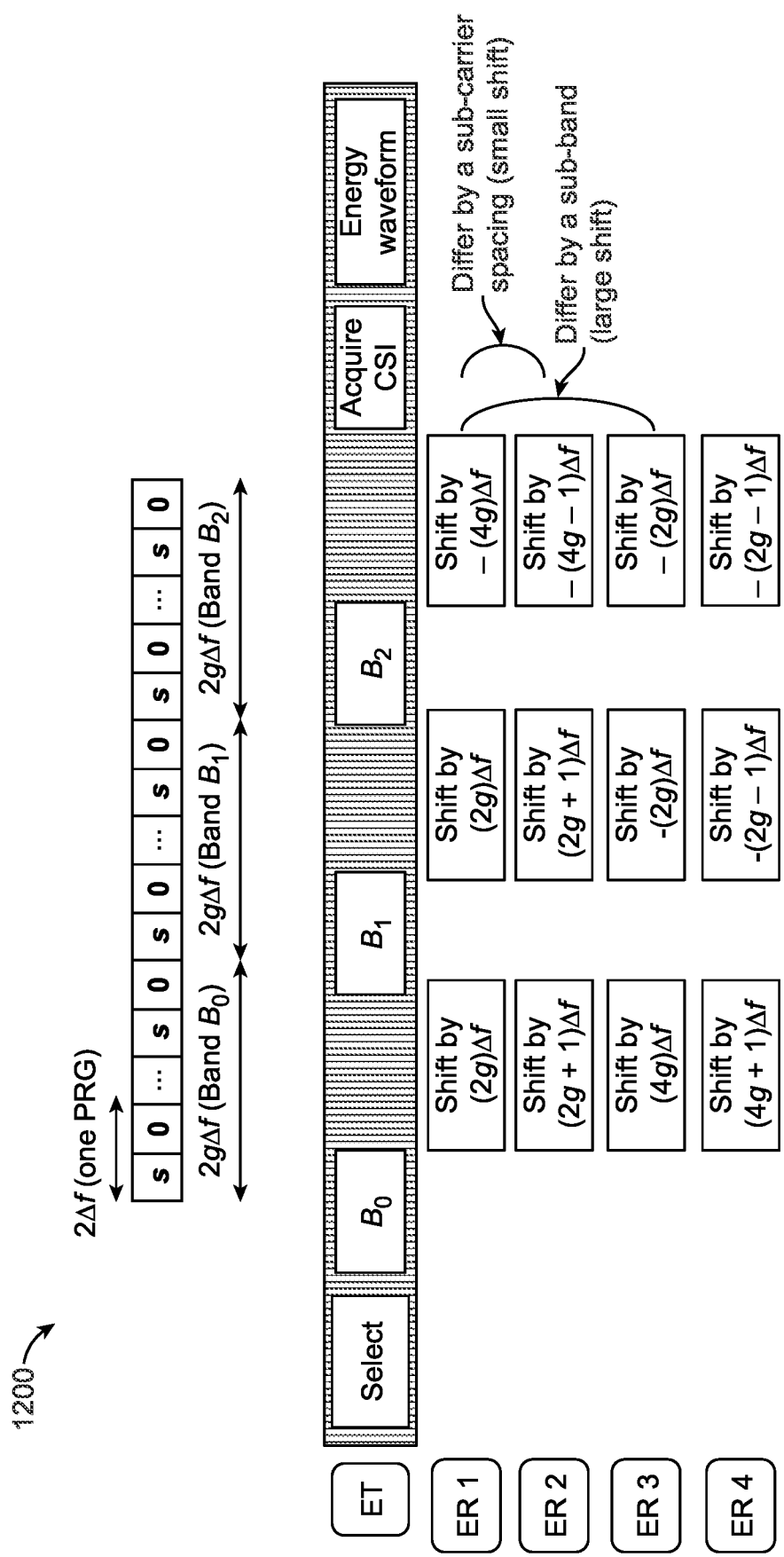
FIG. 12 is a diagram illustrating another example of communications between an energy transmitter and an energy receiver for determining control information associated with a wideband bandwidth, in accordance with some examples.

FIG. 12 is a diagram illustrating an example of multiplexed communications between an energy transmitter (ET) and a plurality of ERs (ER1, ER2, ER3, ER4) based on a sub-band frequency shift and a sub-carrier frequency shift. A wideband bandwidth can be divided into n=3 sub-bands, depicted as sub-bands $B_0$, $B_1$, and $B_2$. Each sub-band can include g PRGs, with each PRG including m=2 sub-carriers. The width of each PRG can be given as $2\Delta f$ (e.g., $m\Delta f$) and the width of each sub-band can be given as $2g\Delta f$.

The ET can transmit (e.g., broadcast) selection information that may be the same as or similar to the configuration information 841 illustrated in FIG. 8. For example, the configuration information transmitted by the ET can be indicative of the frequency shift associated with each ER included in the plurality of ERs that will be multiplexed onto the wideband bandwidth. The configuration information can be indicative of a different frequency shift associated with each ER included in the plurality of ERs. For example, each frequency shift can be a different combination of a sub-band shift and a sub-carrier shift.

As illustrated in FIG. 12, for n=3 and m=2, up to $(3-1)*2=4$ different ERs can be multiplexed onto the wideband bandwidth associated with the ET. For example, the ET can transmit (e.g., broadcast) a first signal on sub-band $B_0$, using the same sub-carrier position within each PRG included in sub-band $B_0$ (e.g., the first sub-carrier position of each of the three PRGs included in $B_0$).

ER1 can apply a frequency shift of one sub-band (e.g., $2g\Delta f$) to the right and shift the received signal from the first sub-carrier of each PRG in $B_0$ to the first sub-carrier of each PRG in $B_1$.

ER2 can apply a frequency shift of one sub-band and one sub-carrier (e.g., $(2g+1)\Delta f$) to the right and shift the received signal from the first sub-carrier of each PRG in $B_0$ to the second sub-carrier of each PRG in $B_1$.

ER3 can apply a frequency shift of two sub-bands (e.g., $4g\Delta f$) to the right and shift the received signal from the first sub-carrier of each PRG in $B_0$ to the first sub-carrier of each PRG in $B_2$.

ER4 can apply a frequency shift of two sub-bands and one sub-carrier (e.g., $(4g+1)\Delta f$) to the right and shift the received signal from the first sub-carrier of each PRG in $B_0$ to the second sub-carrier of each PRG in $B_2$.

The ET can transmit (e.g., broadcast) a second signal on sub-band $B_1$, again using the same sub-carrier position in each PRG included in $B_1$ (e.g., the first sub-carrier of each PRG). ER1 can apply a frequency shift of one sub-band (e.g., $2g\Delta f$) to the right and shift the received signal from the first sub-carrier of each PRG in $B_1$ to the first sub-carrier of each PRG in $B_2$. ER2 can apply a frequency shift of one sub-band and one sub-carrier (e.g., $(2g+1)\Delta f$) to the right and shift the received signal from the first sub-carrier of each PRG in $B_1$ to the second sub-carrier of each PRG in $B_2$. ER3 can apply a frequency shift of one sub-band (e.g., $-2g\Delta f$) to the left and shift the received signal from the first sub-carrier of each PRG in $B_1$ to the first sub-carrier of each PRG in $B_0$. ER4 can apply a frequency shift of one sub-band and one sub-carrier (e.g., $(-2g-1)\Delta f$) to the left and shift the received signal from the first sub-carrier of each PRG in $B_1$ to the second sub-carrier of each PRG in $B_0$.

The ET can transmit (e.g., broadcast) a third signal on sub-band $B_2$, again using the same sub-carrier position in each PRG included in $B_2$ (e.g., the first sub-carrier of each PRG). ER1 can apply a frequency shift of two sub-bands (e.g., $-4g\Delta f$) to the left and shift the received signal from the first sub-carrier of each PRG in $B_2$ to the first sub-carrier of each PRG in $B_0$. ER2 can apply a frequency shift of two sub-bands and one sub-carrier (e.g., $(2g+1)\Delta f$) to the left and shift the received signal from the first sub-carrier of each PRG in $B_2$ to the second sub-carrier of each PRG in $B_0$. ER3 can apply a frequency shift of one sub-band (e.g., $-2g\Delta f$) to the left and shift the received signal from the first sub-carrier of each PRG in $B_2$ to the first sub-carrier of each PRG in $B_1$. ER4 can apply a frequency shift of one sub-band and one sub-carrier (e.g., $(-2g-1)\Delta f$) to the left and shift the received signal from the first sub-carrier of each PRG in $B_2$ to the second sub-carrier of each PRG in $B_1$.

Figure 13:
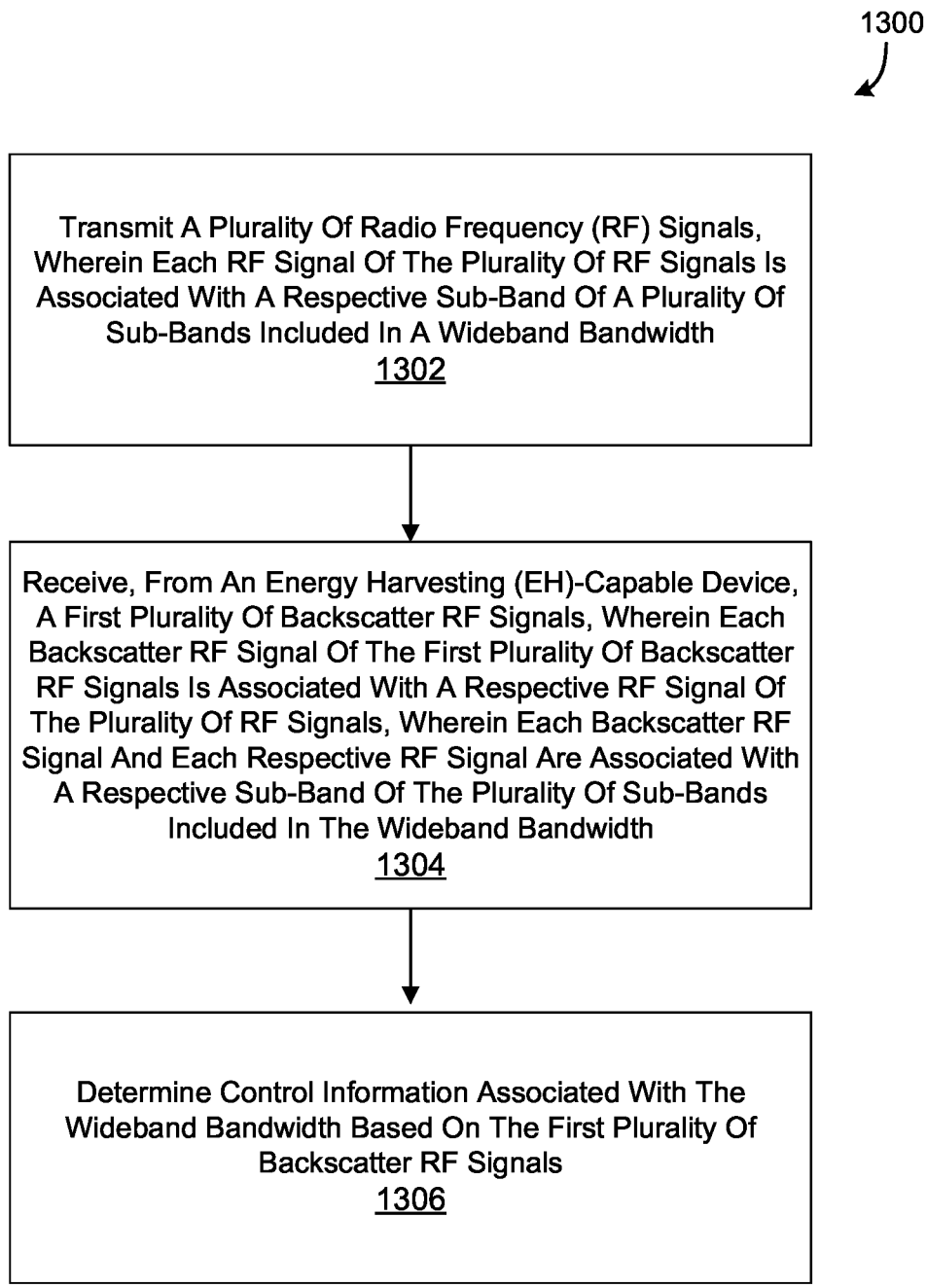
FIG. 13 is a flow diagram illustrating an example of a process for wireless communications, in accordance with some examples.

FIG. 13 is a flowchart diagram illustrating an example of a process 1300 for wireless communications. The process 1300 may be performed by a first network node or by a component or system (e.g., a chipset) of the first network node. The first network node may be a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 1300 may be performed by a UE and/or an energy harvesting device. In some cases, the UE can be an energy harvesting device. The operations of the process 1300 may be implemented as software components that are executed and run on one or more processors (e.g., processor 1510 of FIG. 15 or other processor(s)). Further, the transmission and reception of signals by the network device in the process 1300 may be enabled, for example, by one or more antennas, one or more transceivers (e.g., wireless transceiver(s)), and/or other communication components (e.g., the transmit processor 220, the receive processor 238, the TX MIMO processor 230, the MIMO detector 236, the modulator(s)/demodulator(s) 232a through 232t, and/or the antenna(es) 234a through 234t of FIG. 2, the communication interface 1540 of FIG. 15, or other antennae(s), transceiver(s), and/or component(s)).

At block 1302, the process 1300 includes transmitting a plurality of radio frequency (RF) signals, wherein each RF signal of the plurality of RF signals is associated with a respective sub-band of a plurality of sub-bands included in a wideband bandwidth. For example, the network entity (or component thereof) can transmit, to an energy harvesting (EH)-capable device, a plurality of RF signals, wherein each RF signal of the plurality of RF signals is associated with a respective sub-band of a plurality of sub-bands included in a wideband bandwidth.

In some examples, the network entity can be an energy transmitter (ET) that is the same as or similar to one or more of the ET 840 illustrated in FIG. 8B, the ET 940 illustrated in FIG. 9, and/or the ET illustrated in FIG. 12. In some examples, the plurality of RF signals can be the same as or similar to the RF signals 810 illustrated in FIG. 8A, the transmitted RF signals 842-848 illustrated in FIG. 8B, the transmitted RF signals 942-946 illustrated in FIG. 9, and/or the transmitted RF signals $B_0$, $B_1$, $B_2$ illustrated in FIG. 12. In some examples, the respective sub-bands of the plurality of sub-bands included in the wideband bandwidth can be the same as or similar to one or more of the sub-bands 812 ($B_0$), 814 ($B_1$), and 816 ($B_2$) illustrated in FIG. 8A; one or more of the sub-bands denoted as Band 0, Band 1, Band 2 in FIG. 9; and/or one or more of the sub-bands illustrated in FIG. 12.

In some examples, the EH-capable device can be a passive or semi-passive EH-capable device. An EH-capable device may also be referred to as an energy harvesting device, and vice versa. In some cases, the EH-capable device can be an active EH-capable device. The EH-capable device may additionally, or alternatively, be provided as a passive or semi-passive IoT device. In some examples, the EH-capable device can be the same as or similar to an EH-capable device implementing the EH-capable device architecture 500 illustrated in FIG. 5. In some cases, the EH-capable device can be the same as or similar to one or more (or all) of the energy receiver (ER) 870 illustrated in FIG. 8B, the ER 970 illustrated in FIG. 9, and one or more of the ER1, ER2, ER3, ER4 illustrated in FIG. 12. For example, the energy receivers (ERs) can each be an EH-capable device.

In some examples, the plurality of RF signals can be transmitted using time-division multiplexing (TDM), wherein the plurality of RF signals are non-overlapping in time. In some cases, each RF signal of the plurality of RF signals can be transmitted using a respective non-overlapping sub-band of the plurality of sub-bands included in the wideband bandwidth. In some examples, the plurality of sub-bands comprises three or more sub-bands of the wideband bandwidth. In some examples, each RF signal of the plurality of RF signals can be transmitted using the same sub-carrier allocation pattern. For example, the three transmitted RF signals 842, 844, 848 illustrated in FIG. 8B can be the same RF signal X (e.g., $X_0=X_1=X_2=X$).

In some examples, the network entity (or component thereof) can transmit configuration information indicative of one or more frequency shifts for transmission of a plurality of backscatter RF signals. For example, the network entity can transmit, to a first EH-capable device, configuration information indicative of the one or more frequency shifts for transmission of a first plurality of backscatter RF signals. For example, the configuration information can be the same as or similar to the configuration information 841 illustrated in FIG. 8B and/or the 'Select' information illustrated in FIG. 12.

At block 1304, the process 1300 includes receiving, from an EH-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth. For example, the network entity (or component thereof) can receive, from the EH-capable device, a respective backscatter RF signal for each respective RF signal of the plurality of RF signals. In some examples, each backscatter RF signal can be the same as or similar to one or more of the backscatter RF signals 872, 874, 878 illustrated in FIG. 8B, one or more of the backscatter RF signals 972, 974, 976 illustrated in FIG. 9, and/or one or more of the backscatter RF signals illustrated in FIG. 12.

In some examples, each respective backscatter RF signal of the first plurality of backscatter RF signal comprises a frequency shifted backscatter of an RF signal of the plurality of RF signals. For example, a frequency shifted backscatter of an RF signal of the plurality of RF signals can be received using an adjacent sub-band of a sub-band of the plurality of sub-bands used to transmit the RF signal. In some cases, a frequency shifted backscatter reflection of an RF signal included in the plurality of RF signals can be received using a cyclic shifted sub-band of a sub-band of the plurality of sub-bands used to transmit the RF signal.

In some examples, to receive the first plurality of backscatter RF signals, the network device can receive, via an adjacent sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal. For example, the network device can receive the particular frequency shifted backscatter signal 872 of the particular RF signal 842, via the adjacent sub-band 814 of the particular sub-band 812 associated with the particular RF signal 842, as illustrated in FIG. 8B. The network device can receive the particular frequency shifted backscatter signal 874 of the particular RF signal 844, via the adjacent sub-band 816 of the particular sub-band 814 associated with the particular RF signal 844, as illustrated in FIG. 8B.

In some examples, to receive the first plurality of backscatter RF signals, the network device can receive, via a cyclic shifted sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal. For example, the network device can receive the particular frequency shifted backscatter signal 878 of the particular RF signal 848, via the cyclic shifted sub-band 812 of the particular sub-band 816 associated with the particular RF signal 848, as illustrated in FIG. 8B.

In some examples, each backscatter RF signal of the first plurality of backscatter RF signals can be frequency shifted to the respective sub-band of the plurality of sub-bands. For example, the respective backscatter RF signals can be frequency shifted based on the configuration information indicative of the one or more frequency shifts for application by each respective EH-capable device. For example, each respective backscatter RF signal received from the EH-capable device can be associated with a first frequency shift away from a first respective RF signal associated with each backscatter RF signal. For example, the backscatter RF signal 872 illustrated in FIG. 8B can be associated with a first frequency shift away from the transmitted RF signal 842 that is associated with the backscatter RF signal 872.

In some examples, the network device can receive, from a second EH-capable device, a second plurality of backscatter RF signals, wherein each backscatter RF signal of the second plurality of backscatter RF signals is associated with a respective RF signal of the plurality of RF signals, wherein each backscatter RF signal of the second plurality of backscatter RF signals is associated with a different sub-band of the plurality of sub-bands than each backscatter RF signal of the first plurality of backscatter RF signals. For example, the network device can transmit (e.g., broadcast) the first RF signal 842 to the EH-capable device and the second EH-capable device, using the first sub-band 812. The network device can receive, from the EH-capable device, a first plurality of backscatter RF signals that includes a first backscatter RF signal 872 that is associated with the second sub-band 814 and can receive, from the second EH-capable device, a second plurality of backscatter RF signals that includes a first backscatter RF signal that is associated with the third sub-band 816. The first backscatter RF signal received from the EH-capable device and the second backscatter RF signal received from the second EH-capable device can each comprise a backscatter of the first RF signal 842 transmitted using the first sub-band 812, wherein each of the first backscatter RF signals is frequency shifted to (and received using) a different one of the sub-bands (e.g., second sub-band 814 and third sub-band 816, respectively). Each second backscatter RF signal received from the second EH-capable device can be associated with a second frequency shift away from the respective RF signal, the second frequency shift being different from the first frequency shift.

In some examples, each backscatter RF signal of the first plurality of backscatter RF signals is associated with a first frequency shift away from a respective RF signal of the plurality of RF signals. Each backscatter RF signal of the second plurality of backscatter RF signals can be associated with a second frequency shift away from the respective RF signal of the plurality of RF signals, the second frequency shift being different from the first frequency shift. In some cases, a plurality of EH-capable devices includes the EH-capable device and the second EH-capable device. The network device can transmit (e.g., broadcast), to the plurality of EH-capable devices, configuration information indicative of one or more respective frequency shifts for application by each respective EH-capable device of the plurality of EH-capable devices.

In some examples, each backscatter RF signal can be associated with a respective plurality of sub-carriers included in the respective sub-band. For example, each backscatter RF signal can be associated with one or more of the plurality of sub-carriers illustrated in FIG. 11 as being included in the sub-band 1100. In some cases, the plurality of sub-carriers comprises a sub-carrier included in each physical resource group (PRG) of a plurality of PRGs included in the respective sub-band. For example, the plurality of PRGs can be the same as or similar to the PRGS 1110, 1120, 1130 illustrated in FIG. 11 as being included in the respective sub-band 1100. In some cases, each PRG of the plurality of PRGs includes a same quantity of sub-carriers, and each sub-carrier included in the respective plurality of sub-carriers can be associated with a same sub-carrier position. For example, the plurality of sub-carriers can include the first sub-carrier (e.g., denoted as 's') of each of the PRGs (e.g., PRGs 1110, 1120, 1130 illustrated in FIG. 11).

In some examples, each backscatter RF signal of the first plurality of backscatter RF signals is associated with a first frequency shift away from a respective RF signal of the plurality of RF signals and a second frequency shift away from the respective RF signal. For example, the first frequency shift can comprise a sub-band frequency shift of one or more sub-bands included in the wideband bandwidth and the second frequency shift can comprise a sub-carrier frequency shift of one or more sub-carriers included in each PRG of the plurality of PRGs. For example, as illustrated in FIG. 12, a backscatter RF signal received from ER2 can be associated with a first frequency shift of 2g$\Delta$f, comprising a sub-band frequency shift of one sub-band, and can be associated with a second frequency shift of 1$\Delta$f, comprising a sub-carrier frequency shift of one sub-carrier in each PRG. In another example, as illustrated in FIG. 12, a backscatter RF signal received from ER4 can be associated with a first frequency shift of 4g$\Delta$f, comprising a sub-band frequency shift of two sub-bands, and can be associated with a second frequency shift of 1$\Delta$f, comprising a sub-carrier frequency shift of one sub-carrier in each PRG.

At block 1306, the process 1300 includes determining control information associated with the wideband bandwidth based on the first plurality of backscatter RF signals. In some examples, determining the control information associated with the wideband bandwidth can include determining first control information associated with the network entity and the EH-capable device, based on the first plurality of backscatter RF signals, and determining second control information associated with the network entity and the second EH-capable device, based on the second plurality of backscatter RF signals.

For example, the control information can comprise channel state information (CSI). In some examples, to determine the control information (e.g., CSI) associated with the wideband bandwidth, the network device (or component thereof), can determine, based on the first plurality of backscatter RF signals, one or more first channel coefficients associated with a first sub-band of the plurality of sub-bands. For example, the one or more first channel coefficients can be the same as or similar to the channel coefficients $H_0$ associated with the first sub-band (Band 0) illustrated in FIG. 9. In some cases, the network device can determine, based on the one or more first channel coefficients, one or more second channel coefficients associated with a second sub-band of the plurality of sub-bands. For example, the network device can determine the one or more second channel coefficients $H_1$, associated with the second-sub-band Band 1, based on the one or more first channel coefficients $H_0$ illustrated in FIG. 9. In some examples, the network entity can determine the one or more second channel coefficients associated with the second sub-band by determining the one or more second channel coefficients based on a backscatter RF signal received using the second sub-band. The backscatter RF signal received using the second sub-band can comprise a backscatter of a respective RF signal transmitted using the first sub-band.

In some examples, the network device can determine, based on the control information, a particular sub-band of the plurality of sub-bands and can transmit, to the EH-capable device, an RF signal for energy harvesting using the particular sub-band. For example, the RF signal for energy harvesting can be the same as or similar to the RF signal for energy harvesting 850 (e.g., an energy signal) illustrated in FIG. 8. In some cases, the RF signal for energy harvesting can be an adaptive multisine waveform including one or more sine frequencies, wherein each sine frequency of the one or more sine frequencies is associated with a respective transmission power level, wherein each respective transmission power level is based on the control information. In some examples, the network device can determine each respective transmission power level based on channel gain information included in the control information. For example, the network device can determine each respective transmission power level based on the channel gain information $H_0$, $H_1$, $H_2$ illustrated in FIG. 9.

Figure 14:
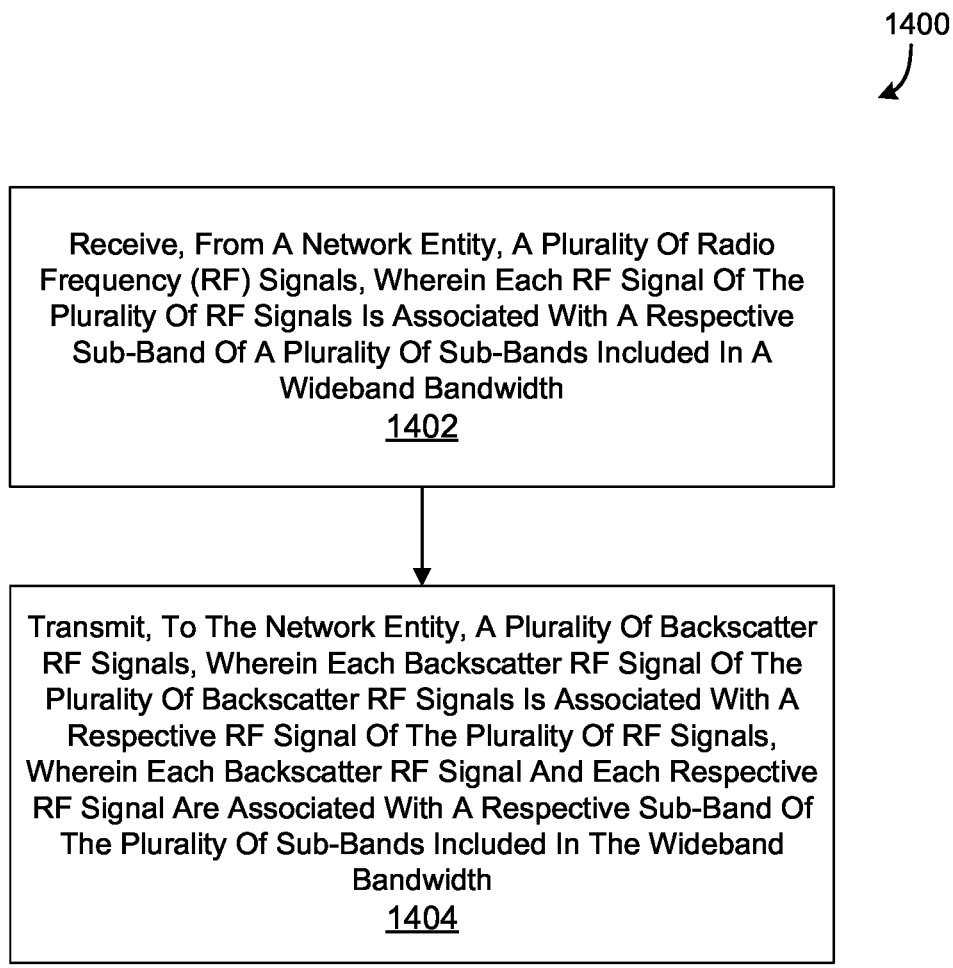
FIG. 14 is a flow diagram illustrating another example of a process for wireless communications, in accordance with some examples.

FIG. 14 is a flowchart diagram illustrating an example of a process 1400 for wireless communications. The process 1400 may be performed by an EH-capable device (e.g., an energy harvesting device) or by a component or system (e.g., a chipset) of the EH-capable device. The EH-capable device may be an IoT device, a sensor, an RFID tag, a UE (e.g., a mobile device such as a mobile phone, a network-connected wearable such as a watch, an extended reality device such as a virtual reality (VR) device or augmented reality (AR) device, a vehicle or component or system of a vehicle, or other type of UE), or other type of energy harvesting device. In some cases, the UE can be an EH-capable device. The operations of the process 1400 may be implemented as software components that are executed and run on one or more processors (e.g., processor(s) 484 of FIG. 4, processor 1610 of FIG. 16, or other processor(s)). Further, the transmission and reception of signals by the network device in the process 1400 may be enabled, for example, by one or more antennas, one or more transceivers (e.g., wireless transceiver(s)), and/or other communication components (e.g., the transmit processor 264, the receive processor 258, the TX MIMO processor 266, the MIMO detector 256, the modulator(s)/demodulator(s) 254a through 254t, and/or the antenna(es) 252a through 252t of FIG. 2, the antenna(es) 487 of FIG. 4, the wireless transceiver(s) 478 of FIG. 4, the communication interface 1540 of FIG. 15, or other antennae(s), transceiver(s), and/or component(s)).

At block 1402, the EH-capable device (or component thereof) can receive, from a network entity, a plurality of radio frequency (RF) signals, wherein each RF signal of the plurality of RF signals is associated with a respective sub-band of a plurality of sub-bands included in a wideband bandwidth. In some examples, the EH-capable device can be a passive or semi-passive EH-capable device. An EH-capable device may also be referred to as an energy harvesting device, and vice versa. In some cases, the EH-capable device can be an active EH-capable device. The EH-capable device may additionally, or alternatively, be provided as a passive or semi-passive IoT device. In some examples, the EH-capable device can be the same as or similar to an EH-capable device implementing the EH-capable device architecture 500 illustrated in FIG. 5. In some cases, the EH-capable device can be the same as or similar to one or more (or all) of the energy receiver (ER) 870 illustrated in FIG. 8B, the ER 970 illustrated in FIG. 9, and one or more of the ER1, ER2, ER3, ER4 illustrated in FIG. 12. For example, the energy receivers (ERs) can each be an EH-capable device.

In some examples, the network entity can be an energy transmitter (ET) that is the same as or similar to one or more of the ET 840 illustrated in FIG. 8B, the ET 940 illustrated in FIG. 9, and/or the ET illustrated in FIG. 12. In some examples, the plurality of RF signals can be the same as or similar to the RF signals 810 illustrated in FIG. 8A, the transmitted RF signals 842-848 illustrated in FIG. 8B, the transmitted RF signals 942-946 illustrated in FIG. 9, and/or the transmitted RF signals $B_0$, $B_1$, $B_2$ illustrated in FIG. 12. In some examples, the respective sub-bands of the plurality of sub-bands included in the wideband bandwidth can be the same as or similar to one or more of the sub-bands 812 ($B_0$), 814 ($B_1$), and 816 ($B_2$) illustrated in FIG. 8A; one or more of the sub-bands denoted as Band 0, Band 1, Band 2 in FIG. 9; and/or one or more of the sub-bands illustrated in FIG. 12.

In some examples, the EH-capable device can receive a plurality of RF signals that are transmitted using time-division multiplexing (TDM), wherein the plurality of RF signals are non-overlapping in time. In some cases, each RF signal of the plurality of RF signals can be received using a respective non-overlapping sub-band of the plurality of sub-bands included in the wideband bandwidth. In some examples, the plurality of sub-bands comprises three or more sub-bands of the wideband bandwidth. In some examples, each RF signal of the plurality of RF signals can be received using the same sub-carrier allocation pattern. For example, the three received RF signals 842, 844, 848 illustrated in FIG. 8B can be the same RF signal X (e.g., $X_0=X_1=X_2=X$).

In some examples, the EH-capable device (or component thereof) can receive configuration information indicative of one or more frequency shifts for transmission of a plurality of backscatter RF signals. For example, the EH-capable device, can receive (e.g., from the network device) configuration information indicative of the one or more frequency shifts for transmission of a first plurality of backscatter RF signals. For example, the configuration information can be the same as or similar to the configuration information 841 illustrated in FIG. 8B and/or the 'Select' information illustrated in FIG. 12.

At block 1404, the EH-capable device (or component thereof) can transmit, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth. In some examples, each backscatter RF signal can be the same as or similar to one or more of the backscatter RF signals 872, 874, 878 illustrated in FIG. 8B, one or more of the backscatter RF signals 972, 974, 976 illustrated in FIG. 9, and/or one or more of the backscatter RF signals illustrated in FIG. 12.

In some examples, each respective backscatter RF signal of the plurality of backscatter RF signal comprises a frequency shifted backscatter of an RF signal of the plurality of RF signals. For example, a frequency shifted backscatter of an RF signal of the plurality of RF signals can be received using an adjacent sub-band of a sub-band of the plurality of sub-bands used to transmit the RF signal. In some cases, a frequency shifted backscatter reflection of an RF signal included in the plurality of RF signals can be received using a cyclic shifted sub-band of a sub-band of the plurality of sub-bands used to transmit the RF signal.

In some examples, to transmit the plurality of backscatter RF signals, the EH-capable device can transmit, via an adjacent sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal. For example, the EH-capable device can transmit (e.g., to the network entity) the particular frequency shifted backscatter signal 872 of the particular RF signal 842, via the adjacent sub-band 814 of the particular sub-band 812 associated with the particular RF signal 842, as illustrated in FIG. 8B. The EH-capable device can transmit (e.g., to the network entity) the particular frequency shifted backscatter signal 874 of the particular RF signal 844, via the adjacent sub-band 816 of the particular sub-band 814 associated with the particular RF signal 844, as illustrated in FIG. 8B.

In some examples, to transmit the plurality of backscatter RF signals, the EH-capable device can transmit, via a cyclic shifted sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal. For example, the EH-capable device can transmit the particular frequency shifted backscatter signal 878 of the particular RF signal 848, via the cyclic shifted sub-band 812 of the particular sub-band 816 associated with the particular RF signal 848, as illustrated in FIG. 8B.

In some examples, each backscatter RF signal of the plurality of backscatter RF signals can be frequency shifted to the respective sub-band of the plurality of sub-bands. For example, the respective backscatter RF signals can be frequency shifted based on configuration information indicative of the one or more frequency shifts for application by the EH-capable device. For example, each respective backscatter RF signal transmitted by the EH-capable device can be associated with a first frequency shift away from a first respective RF signal associated with each backscatter RF signal. For example, the backscatter RF signal 872 illustrated in FIG. 8B can be associated with a first frequency shift away from the RF signal 842 that is associated with the backscatter RF signal 872.

In some examples, each backscatter RF signal of the plurality of backscatter RF signals can be associated with a respective plurality of sub-carriers included in the respective sub-band. For example, each backscatter RF signal can be associated with one or more of the plurality of sub-carriers illustrated in FIG. 11 as being included in the sub-band 1100. In some cases, the plurality of sub-carriers comprises a sub-carrier included in each physical resource group (PRG) of a plurality of PRGs included in the respective sub-band. For example, the plurality of PRGs can be the same as or similar to the PRGS 1110, 1120, 1130 illustrated in FIG. 11 as being included in the respective sub-band 1100. In some cases, each PRG of the plurality of PRGs includes a same quantity of sub-carriers, and each sub-carrier included in the respective plurality of sub-carriers can be associated with a same sub-carrier position. For example, the plurality of sub-carriers can include the first sub-carrier (e.g., denoted as 's') of each of the PRGs (e.g., PRGs 1110, 1120, 1130 illustrated in FIG. 11).

In some examples, each backscatter RF signal of the plurality of backscatter RF signals is associated with a first frequency shift away from a respective RF signal of the plurality of RF signals and a second frequency shift away from the respective RF signal. For example, the first frequency shift can comprise a sub-band frequency shift of one or more sub-bands included in the wideband bandwidth and the second frequency shift can comprise a sub-carrier frequency shift of one or more sub-carriers included in each PRG of the plurality of PRGs. For example, as illustrated in FIG. 12, a backscatter RF signal received from ER2 can be associated with a first frequency shift of 2gΔf, comprising a sub-band frequency shift of one sub-band, and can be associated with a second frequency shift of 1Δf, comprising a sub-carrier frequency shift of one sub-carrier in each PRG. In another example, as illustrated in FIG. 12, a backscatter RF signal received from ER4 can be associated with a first frequency shift of 4gΔf, comprising a sub-band frequency shift of two sub-bands, and can be associated with a second frequency shift of 1Δf, comprising a sub-carrier frequency shift of one sub-carrier in each PRG.

In some examples, the processes described herein (e.g., process 1300, the process 1400, and/or other process described herein) may be performed by a computing device or apparatus (e.g., a network node such as a UE, base station, a portion of a base station, etc.). For example, as noted above, one or more of the processes described herein (e.g., the process 1300, the process 1400, and/or other process described herein) may be performed by a UE and/or an energy harvesting device (e.g., an EH-capable device). In some examples, one or more of the processes described herein (e.g., the process 1300, the process 1400, and/or other process described herein) may be performed by an EH-capable device with an architecture that is the same as or similar to the EH-capable device architecture shown in FIG. 5.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1300 and the process 1400 are illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1300, the process 1400, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
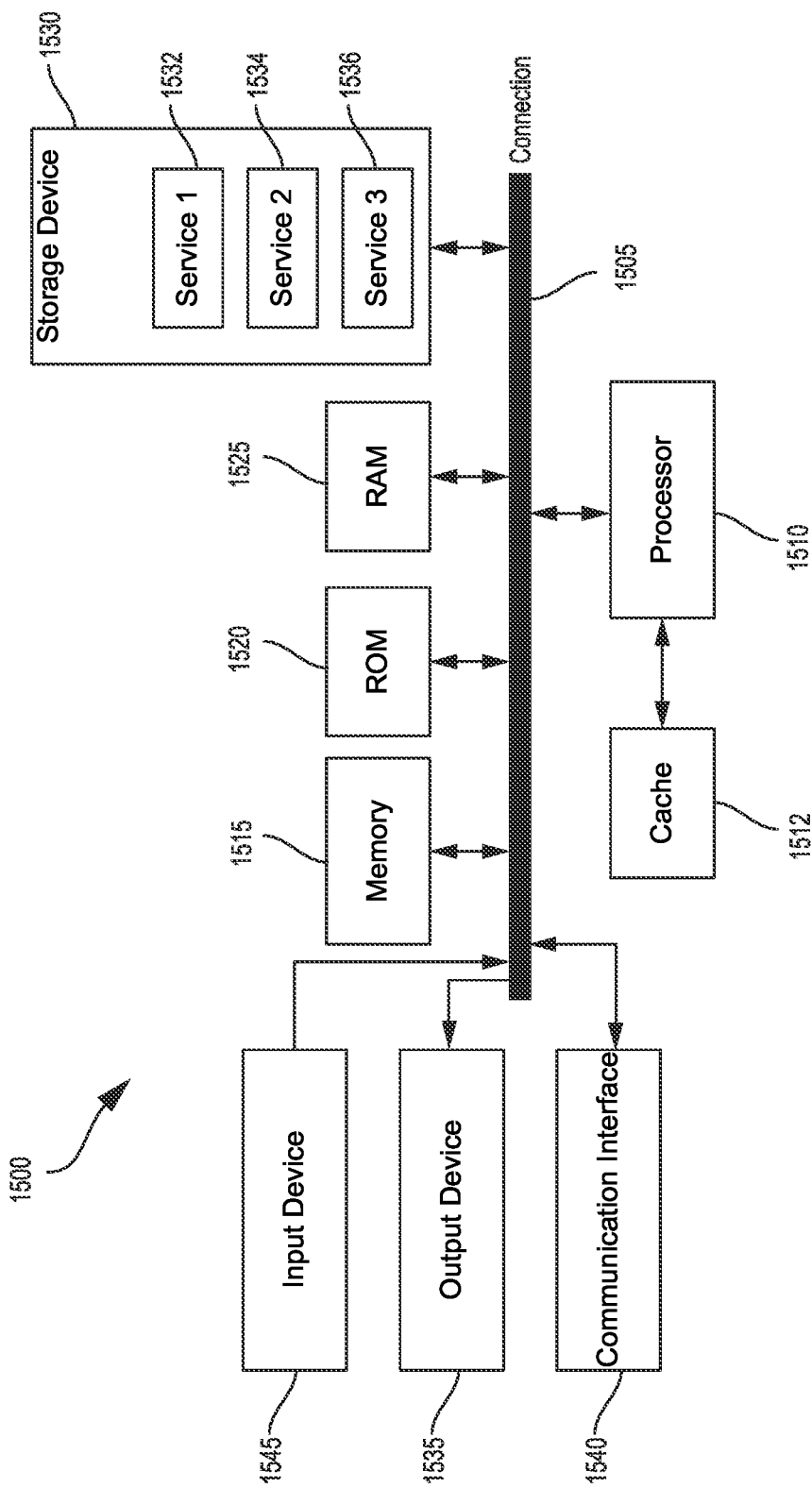
FIG. 15 is a block diagram illustrating an example of a computing system, in accordance with some examples.

FIG. 15 is a diagram illustrating an example of a system for implementing certain aspects of the present technology. In particular, FIG. 15 illustrates an example of computing system 1500, which may be for example any computing device making up internal computing system, a remote computing system, a camera, or any component thereof in which the components of the system are in communication with each other using connection 1505. Connection 1505 may be a physical connection using a bus, or a direct connection into processor 1510, such as in a chipset architecture. Connection 1505 may also be a virtual connection, networked connection, or logical connection.

In some aspects, computing system 1500 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 may include a cache 1515 of high-speed memory connected directly with, in close proximity to, or integrated as part of processor 1510.

Processor 1510 may include any general-purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which may represent any number of input mechanisms, such as a microphone for speech, a touch-sensitive screen for gesture or graphical input, keyboard, mouse, motion input, speech, etc. Computing system 1500 may also include output device 1535, which may be one or more of a number of output mechanisms. In some instances, multimodal systems may enable a user to provide multiple types of input/output to communicate with computing system 1500.

Computing system 1500 may include communications interface 1540, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 may include software services, servers, services, etc., that when the code that defines such software is executed by the processor 1510, it causes the system to perform a function. In some aspects, a hardware service that performs a particular function may include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A network entity for wireless communication, comprising: at least one memory; and at least one processor coupled to the at least one memory, the at least one processor configured to: transmit a plurality of radio frequency (RF) signals, wherein each RF signal of the plurality of RF signals is associated with a respective sub-band of a plurality of sub-bands included in a wideband bandwidth; receive, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and determine control information associated with the wideband bandwidth based on the first plurality of backscatter RF signals.

Aspect 2. The network entity of clause 1, wherein the control information comprises channel state information (CSI).

Aspect 3. The network entity of any of clauses 1 or 2, wherein, to determine the control information associated with the wideband bandwidth, the at least one processor is configured to: determine, based on the first plurality of backscatter RF signals, one or more first channel coefficients associated with a first sub-band of the plurality of sub-bands; and determine, based on the one or more first channel coefficients, one or more second channel coefficients associated with a second sub-band of the plurality of sub-bands.

Aspect 4. The network entity of clause 3, wherein, to determine the one or more second channel coefficients associated with the second sub-band, the at least one processor is configured to: determine the one or more second channel coefficients based on a backscatter RF signal received using the second sub-band.

Aspect 5. The network entity of clause 4, wherein the backscatter RF signal received using the second sub-band comprises a backscatter of a respective RF signal transmitted using the first sub-band.

Aspect 6. The network entity of any of clauses 1 to 5, wherein the at least one processor is further configured to: determine, based on the control information, a particular sub-band of the plurality of sub-bands; and transmit, to the EH-capable device, an RF signal for energy harvesting using the particular sub-band.

Aspect 7. The network entity of clause 6, wherein the RF signal for energy harvesting is an adaptive multisine waveform including one or more sine frequencies, wherein each sine frequency of the one or more sine frequencies is associated with a respective transmission power level, wherein each respective transmission power level is based on the control information.

Aspect 8. The network entity of clause 7, wherein the at least one processor is configured to determine each respective transmission power level based on channel gain information included in the control information.

Aspect 9. The network entity of any of clauses 1 to 8, wherein each respective backscatter RF signal of the first plurality of backscatter RF signals comprises a respective frequency shifted backscatter of an RF signal of the plurality of RF signals.

Aspect 10. The network entity of clause 9, wherein, to receive the first plurality of backscatter RF signals, the at least one processor is configured to receive, via an adjacent sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal.

Aspect 11. The network entity of clause 9, wherein, to receive the first plurality of backscatter RF signals, the at least one processor is configured to receive, via a cyclic shifted sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal.

Aspect 12. The network entity of any of clauses 1 to 11, wherein the at least one processor is further configured to: transmit, to the EH-capable device, configuration information indicative of one or more frequency shifts for transmission for the first plurality of backscatter RF signals.

Aspect 13. The network entity of any of clauses 1 to 12, wherein the at least one processor is further configured to: receive, from a second EH-capable device, a second plurality of backscatter RF signals, wherein each backscatter RF signal of the second plurality of backscatter RF signals is associated with a respective RF signal of the plurality of RF signals, wherein each backscatter RF signal of the second plurality of backscatter RF signals is associated with a different sub-band of the plurality of sub-bands than each backscatter RF signal of the first plurality of backscatter RF signals.

Aspect 14. The network entity of clause 13, wherein, to determine the control information associated with the wideband bandwidth, the at least one processor is configured to: determine first control information associated with the network entity and the EH-capable device based on the first plurality of backscatter RF signals; and determine second control information associated with the network entity and the second EH-capable device based on the second plurality of backscatter RF signals.

Aspect 15. The network entity of any of clauses 13 or 14, wherein: each backscatter RF signal of the first plurality of backscatter RF signals is associated with a first frequency shift away from a respective RF signal of the plurality of RF signals; and each backscatter RF signal of the second plurality of backscatter RF signals is associated with a second frequency shift away from a respective RF signal of the plurality of RF signals, the second frequency shift being different from the first frequency shift.

Aspect 16. The network entity of any of clauses 13 to 15, wherein a plurality of EH-capable devices includes the EH-capable device and the second EH-capable device, and wherein the at least one processor is configured to: transmit, to the plurality of EH-capable devices, configuration information indicative of one or more respective frequency shifts for application by each respective EH-capable device of the plurality of EH-capable devices.

Aspect 17. The network entity of any of clauses 1 to 16, wherein, to transmit the plurality of RF signals, the at least one processor is configured to: transmit the plurality of RF signals using time-division multiplexing (TDM), wherein the plurality of RF signals are non-overlapping in time.

Aspect 18. The network entity of any of clauses 1 to 17, wherein, to transmit the plurality of RF signals, the at least one processor is configured to: transmit each RF signal of the plurality of RF signals using a respective non-overlapping sub-band of the plurality of sub-bands included in the wideband bandwidth.

Aspect 19. The network entity of any of clauses 1 to 18, wherein the plurality of sub-bands comprises three or more sub-bands of the wideband bandwidth.

Aspect 20. The network entity of any of clauses 1 to 19, wherein each backscatter RF signal of the first plurality of backscatter RF signals is associated with a respective plurality of sub-carriers included in the respective sub-band.

Aspect 21. The network entity of clause 20, wherein the respective plurality of sub-carriers comprises a sub-carrier included in each physical resource group (PRG) of a plurality of PRGs included in the respective sub-band.

Aspect 22. The network entity of clause 21, wherein: each PRG of the plurality of PRGs includes a same quantity of sub-carriers; and each sub-carrier included in the respective plurality of sub-carriers is associated with a same sub-carrier position.

Aspect 23. The network entity of any of clauses 21 or 22, wherein each backscatter RF signal of the first plurality of backscatter RF signals is associated with a first frequency shift away from a respective RF signal of the plurality of RF signals and a second frequency shift away from the respective RF signal.

Aspect 24. The network entity of clause 23, wherein: the first frequency shift comprises a sub-band frequency shift of one or more sub-bands included in the wideband bandwidth; and the second frequency shift comprises a sub-carrier frequency shift of one or more sub-carriers included in each PRG of the plurality of PRGs.

Aspect 25. An energy harvesting (EH)-capable device for wireless communication, comprising: at least one memory; and at least one processor coupled to the at least one memory, the at least one processor configured to: receive, from a network entity, a plurality of radio frequency (RF) signals, wherein each RF signal of the plurality of RF signals is associated with a respective sub-band of a plurality of sub-bands included in a wideband bandwidth; and transmit, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

Aspect 26. The EH-capable device of clause 25, wherein the at least one processor is further configured to: receive, from the network entity, an RF signal for energy harvesting using a particular sub-band of the plurality of sub-bands, wherein the particular sub-band is associated with control information associated with the wideband bandwidth.

Aspect 27. The EH-capable device of clause 26, wherein the control information comprises channel state information (CSI).

Aspect 28. The EH-capable device of any of clauses 26 or 27, wherein the RF signal is an adaptive multisine waveform including one or more sine frequencies, wherein each sine frequency included in the one or more sine frequencies is associated with a respective transmission power level determined based on the control information.

Aspect 29. The EH-capable device of any of clauses 25 to 28, wherein each respective backscatter RF signal of the plurality of backscatter RF signals comprises a respective frequency shifted backscatter of an RF signal of the plurality of RF signals.

Aspect 30. The EH-capable device of clause 29, wherein a particular frequency shifted backscatter of a particular RF signal is received using an adjacent sub-band of a particular sub-band associated with the particular RF signal, wherein the plurality of sub-bands includes the particular sub-band, and wherein the plurality of RF signals includes the particular RF signal.

Aspect 31. The EH-capable device of clause 29, wherein a particular frequency shifted backscatter of a particular RF signal is received using a cyclic shifted sub-band of a particular sub-band associated with the particular RF signal, wherein the plurality of sub-bands includes the particular sub-band, and wherein the plurality of RF signals includes the particular RF signal.

Aspect 32. The EH-capable device of any of clauses 25 to 31, wherein the at least one processor is further configured to: receive, from the network entity, configuration information indicative of one or more frequency shifts for transmission for the plurality of backscatter RF signals.

Aspect 33. The EH-capable device of any of clauses 25 to 32, wherein the at least one processor is configured to receive each RF signal included in the plurality of RF signals on a respective non-overlapping sub-band of the plurality of sub-bands included in the wideband bandwidth.

Aspect 34. The EH-capable device of any of clauses 25 to 33, wherein the plurality of sub-bands comprises three or more sub-bands of the wideband bandwidth.

Aspect 35. The EH-capable device of any of clauses 25 to 34, wherein each backscatter RF signal of the plurality of backscatter RF signals is associated with a respective plurality of sub-carriers included in the respective sub-band.

Aspect 36. The EH-capable device of clause 35, wherein the respective plurality of sub-carriers comprises a sub-carrier included in each physical resource group (PRG) of a plurality of PRGs included in the respective sub-band.

Aspect 37. The EH-capable device of clause 36, wherein: each PRG of the plurality of PRGs includes a same quantity of sub-carriers; and each sub-carrier included in the respective plurality of sub-carriers is associated with a same sub-carrier position.

Aspect 38. The EH-capable device of any of clauses 36 or 37, wherein each backscatter RF signal of the plurality of backscatter RF signals is associated with a first frequency shift away from a respective RF signal of the plurality of RF signals and a second frequency shift away from the respective RF signal.

Aspect 39. The EH-capable device of clause 38, wherein: the first frequency shift comprises a sub-band frequency shift of one or more sub-bands included in the wideband bandwidth; and the second frequency shift comprises a sub-carrier frequency shift of one or more sub-carriers included in each PRG of the plurality of PRGs.

Aspect 40. A method of wireless communication performed by a network entity, comprising: transmitting a plurality of radio frequency (RF) signals, wherein each RF signal of the plurality of RF signals is associated with a respective sub-band of a plurality of sub-bands included in a wideband bandwidth; receiving, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and determining control information associated with the wideband bandwidth based on the first plurality of backscatter RF signals.

Aspect 41. The method of clause 40, wherein the control information comprises channel state information (CSI).

Aspect 42. The method of any of clauses 40 or 41, wherein determining the control information associated with the wideband bandwidth comprises: determining, based on the first plurality of backscatter RF signals, one or more first channel coefficients associated with a first sub-band of the plurality of sub-bands; and determining, based on the one or more first channel coefficients, one or more second channel coefficients associated with a second sub-band of the plurality of sub-bands.

Aspect 43. The method of clause 42, wherein determining the one or more second channel coefficients associated with the second sub-band comprises: determining the one or more second channel coefficients based on a backscatter RF signal received using the second sub-band.

Aspect 44. The method of clause 43, wherein the backscatter RF signal received using the second sub-band comprises a backscatter of a respective RF signal transmitted using the first sub-band.

Aspect 45. The method of any of clauses 40 to 44, further comprising: determining, based on the control information, a particular sub-band of the plurality of sub-bands; and transmitting, to the EH-capable device, an RF signal for energy harvesting using the particular sub-band.

Aspect 46. The method of clause 45, wherein the RF signal for energy harvesting is an adaptive multisine waveform including one or more sine frequencies, wherein each sine frequency of the one or more sine frequencies is associated with a respective transmission power level, wherein each respective transmission power level is based on the control information.

Aspect 47. The method of clause 46, further comprising determining each respective transmission power level based on channel gain information included in the control information.

Aspect 48. The method of any of clauses 40 to 47, wherein each respective backscatter RF signal of the first plurality of backscatter RF signals comprises a respective frequency shifted backscatter of an RF signal of the plurality of RF signals.

Aspect 49. The method of clause 48, wherein receiving the first plurality of backscatter RF signals comprises receiving, via an adjacent sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal.

Aspect 50. The method of clause 48, wherein receiving the first plurality of backscatter RF signals comprises receiving, via a cyclic shifted sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal.

Aspect 51. The method of any of clauses 40 to 50, further comprising: transmitting, to the EH-capable device, configuration information indicative of one or more frequency shifts for transmission for the first plurality of backscatter RF signals.

Aspect 52. The method of any of clauses 40 to 51, further comprising: receiving, from a second EH-capable device, a second plurality of backscatter RF signals, wherein each backscatter RF signal of the second plurality of backscatter RF signals is associated with a respective RF signal of the plurality of RF signals, wherein each backscatter RF signal of the second plurality of backscatter RF signals is associated with a different sub-band of the plurality of sub-bands than each backscatter RF signal of the first plurality of backscatter RF signals.

Aspect 53. The method of clause 52, wherein determining the control information associated with the wideband bandwidth comprises: determining first control information associated with the network entity and the EH-capable device based on the first plurality of backscatter RF signals; and determining second control information associated with the network entity and the second EH-capable device based on the second plurality of backscatter RF signals.

Aspect 54. The method of any of clauses 52 or 53, wherein: each backscatter RF signal of the first plurality of backscatter RF signals is associated with a first frequency shift away from a respective RF signal of the plurality of RF signals; and each backscatter RF signal of the second plurality of backscatter RF signals is associated with a second frequency shift away from a respective RF signal of the plurality of RF signals, the second frequency shift being different from the first frequency shift.

Aspect 55. The method of any of clauses 52 to 54, wherein a plurality of EH-capable devices includes the EH-capable device and the second EH-capable device, and further comprising: transmitting, to the plurality of EH-capable devices, configuration information indicative of one or more respective frequency shifts for application by each respective EH-capable device of the plurality of EH-capable devices.

Aspect 56. The method of any of clauses 40 to 55, wherein transmitting the plurality of RF signals comprises: transmitting the plurality of RF signals using time-division multiplexing (TDM), wherein the plurality of RF signals are non-overlapping in time.

Aspect 57. The method of any of clauses 40 to 56, wherein transmitting the plurality of RF signals comprises: transmitting each RF signal of the plurality of RF signals using a respective non-overlapping sub-band of the plurality of sub-bands included in the wideband bandwidth.

Aspect 58. The method of any of clauses 40 to 57, wherein the plurality of sub-bands comprises three or more sub-bands of the wideband bandwidth.

Aspect 59. The method of any of clauses 40 to 58, wherein each backscatter RF signal of the first plurality of backscatter RF signals is associated with a respective plurality of sub-carriers included in the respective sub-band.

Aspect 60. The method of clause 59, wherein the respective plurality of sub-carriers comprises a sub-carrier included in each physical resource group (PRG) of a plurality of PRGs included in the respective sub-band.

Aspect 61. The method of clause 60, wherein: each PRG of the plurality of PRGs includes a same quantity of sub-carriers; and each sub-carrier included in the respective plurality of sub-carriers is associated with a same sub-carrier position.

Aspect 62. The method of any of clauses 60 or 61, wherein each backscatter RF signal of the first plurality of backscatter RF signals is associated with a first frequency shift away from a respective RF signal of the plurality of RF signals and a second frequency shift away from the respective RF signal.

Aspect 63. The method of clause 62, wherein: the first frequency shift comprises a sub-band frequency shift of one or more sub-bands included in the wideband bandwidth; and the second frequency shift comprises a sub-carrier frequency shift of one or more sub-carriers included in each PRG of the plurality of PRGs.

Aspect 64. A method of wireless communication performed by an energy harvesting (EH)-capable device, comprising: receiving, from a network entity, a plurality of radio frequency (RF) signals, wherein each RF signal of the plurality of RF signals is associated with a respective sub-band of a plurality of sub-bands included in a wideband bandwidth; and transmitting, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

Aspect 65. The method of clause 64, further comprising: receiving, from the network entity, an RF signal for energy harvesting using a particular sub-band of the plurality of sub-bands, wherein the particular sub-band is associated with control information associated with the wideband bandwidth.

Aspect 66. The method of clause 65, wherein the control information comprises channel state information (CSI).

Aspect 67. The method of any of clauses 65 or 66, wherein the RF signal is an adaptive multisine waveform including one or more sine frequencies, wherein each sine frequency included in the one or more sine frequencies is associated with a respective transmission power level determined based on the control information.

Aspect 68. The method of any of clauses 64 to 67, wherein each respective backscatter RF signal of the plurality of backscatter RF signals comprises a respective frequency shifted backscatter of an RF signal of the plurality of RF signals.

Aspect 69. The method of clause 68, wherein a particular frequency shifted backscatter of a particular RF signal is received using an adjacent sub-band of a particular sub-band associated with the particular RF signal, wherein the plurality of sub-bands includes the particular sub-band, and wherein the plurality of RF signals includes the particular RF signal.

Aspect 70. The method of clause 68, wherein a particular frequency shifted backscatter of a particular RF signal is received using a cyclic shifted sub-band of a particular sub-band associated with the particular RF signal, wherein the plurality of sub-bands includes the particular sub-band, and wherein the plurality of RF signals includes the particular RF signal.

Aspect 71. The method of any of clauses 64 to 70, further comprising: receiving, from the network entity, configuration information indicative of one or more frequency shifts for transmission for the plurality of backscatter RF signals.

Aspect 72. The method of any of clauses 64 to 71, further comprising receiving each RF signal included in the plurality of RF signals on a respective non-overlapping sub-band of the plurality of sub-bands included in the wideband bandwidth.

Aspect 73. The method of any of clauses 64 to 72, wherein the plurality of sub-bands comprises three or more sub-bands of the wideband bandwidth.

Aspect 74. The method of any of clauses 64 to 73, wherein each backscatter RF signal of the plurality of backscatter RF signals is associated with a respective plurality of sub-carriers included in the respective sub-band.

Aspect 75. The method of clause 74, wherein the respective plurality of sub-carriers comprises a sub-carrier included in each physical resource group (PRG) of a plurality of PRGs included in the respective sub-band.

Aspect 76. The method of clause 75, wherein: each PRG of the plurality of PRGs includes a same quantity of sub-carriers; and each sub-carrier included in the respective plurality of sub-carriers is associated with a same sub-carrier position.

Aspect 77. The method of any of clauses 75 or 76, wherein each backscatter RF signal of the plurality of backscatter RF signals is associated with a first frequency shift away from a respective RF signal of the plurality of RF signals and a second frequency shift away from the respective RF signal.

Aspect 78. The method of clause 77, wherein: the first frequency shift comprises a sub-band frequency shift of one or more sub-bands included in the wideband bandwidth; and the second frequency shift comprises a sub-carrier frequency shift of one or more sub-carriers included in each PRG of the plurality of PRGs.

Aspect 79. A non-transitory computer-readable medium having stored thereon instructions that, when executed by at least one processor, cause the at least one processor to perform operation according to any of Aspects 40 to 63.

Aspect 80. An apparatus for wireless communications, comprising one or more means for performing operations according to any of Aspects 40 to 63.

Aspect 81. A non-transitory computer-readable medium having stored thereon instructions that, when executed by at least one processor, cause the at least one processor to perform operation according to any of Aspects 64 to 78.

Aspect 82. An apparatus for wireless communications, comprising one or more means for performing operations according to any of Aspects 64 to 78.

What is claimed is:

1. A network entity for wireless communication, comprising:
    at least one memory; and
    at least one processor coupled to the at least one memory, the at least one processor configured to:
       transmit a plurality of radio frequency (RF) signals, wherein each RF signal of the plurality of RF signals is associated with a respective sub-band of a plurality of sub-bands included in a wideband bandwidth, and wherein the plurality of sub-bands comprises three or more sub-bands of the wideband bandwidth;
       receive, from an energy harvesting (EH)-capable device, a first plurality of backscatter RF signals, wherein each backscatter RF signal of the first plurality of backscatter RF signals is associated with a respective RF signal of the plurality of RF signals, wherein each backscatter RF signal and each respective RF signal are associated with a respective sub-band of the plurality of sub-bands included in the wideband bandwidth; and
       determine control information associated with the wideband bandwidth based on the first plurality of backscatter RF signals.

2. The network entity of claim 1, wherein the control information comprises channel state information (CSI).

3. The network entity of claim 1, wherein, to determine the control information associated with the wideband bandwidth, the at least one processor is configured to:
    determine, based on the first plurality of backscatter RF signals, one or more first channel coefficients associated with a first sub-band of the plurality of sub-bands; and
    determine, based on the one or more first channel coefficients, one or more second channel coefficients associated with a second sub-band of the plurality of sub-bands.

4. The network entity of claim 3, wherein, to determine the one or more second channel coefficients associated with the second sub-band, the at least one processor is configured to:
determine the one or more second channel coefficients based on a backscatter RF signal received using the second sub-band.

5. The network entity of claim 4, wherein the backscatter RF signal received using the second sub-band comprises a backscatter of a respective RF signal transmitted using the first sub-band.

6. The network entity of claim 1, wherein the at least one processor is further configured to:
determine, based on the control information, a particular sub-band of the plurality of sub-bands; and
transmit, to the EH-capable device, an RF signal for energy harvesting using the particular sub-band.

7. The network entity of claim 6, wherein the RF signal for energy harvesting is an adaptive multisine waveform including one or more sine frequencies, wherein each sine frequency of the one or more sine frequencies is associated with a respective transmission power level, wherein each respective transmission power level is based on the control information.

8. The network entity of claim 7, wherein the at least one processor is configured to determine each respective transmission power level based on channel gain information included in the control information.

9. The network entity of claim 1, wherein each respective backscatter RF signal of the first plurality of backscatter RF signals comprises a respective frequency shifted backscatter of an RF signal of the plurality of RF signals.

10. The network entity of claim 9, wherein, to receive the first plurality of backscatter RF signals, the at least one processor is configured to receive, via an adjacent sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal.

11. The network entity of claim 9, wherein, to receive the first plurality of backscatter RF signals, the at least one processor is configured to receive, via a cyclic shifted sub-band of a particular sub-band associated with a particular RF signal, a particular frequency shifted backscatter of the particular RF signal, wherein the plurality of sub-bands includes the particular sub-band, and wherein the plurality of RF signals includes the particular RF signal.

12. The network entity of claim 1, wherein the at least one processor is further configured to:
transmit, to the EH-capable device, configuration information indicative of one or more frequency shifts for transmission for the first plurality of backscatter RF signals.

13. The network entity of claim 1, wherein the at least one processor is further configured to:
receive, from a second EH-capable device, a second plurality of backscatter RF signals, wherein each backscatter RF signal of the second plurality of backscatter RF signals is associated with a respective RF signal of the plurality of RF signals, wherein each backscatter RF signal of the second plurality of backscatter RF signals is associated with a different sub-band of the plurality of sub-bands than each backscatter RF signal of the first plurality of backscatter RF signals.

14. The network entity of claim 13, wherein, to determine the control information associated with the wideband bandwidth, the at least one processor is configured to:
determine first control information associated with the network entity and the EH-capable device based on the first plurality of backscatter RF signals; and
determine second control information associated with the network entity and the second EH-capable device based on the second plurality of backscatter RF signals.

15. The network entity of claim 13, wherein:
each backscatter RF signal of the first plurality of backscatter RF signals is associated with a first frequency shift away from a respective RF signal of the plurality of RF signals; and
each backscatter RF signal of the second plurality of backscatter RF signals is associated with a second frequency shift away from a respective RF signal of the plurality of RF signals, the second frequency shift being different from the first frequency shift.

16. The network entity of claim 13, wherein a plurality of EH-capable devices includes the EH-capable device and the second EH-capable device, and wherein the at least one processor is configured to:
transmit, to the plurality of EH-capable devices, configuration information indicative of one or more respective frequency shifts for application by each respective EH-capable device of the plurality of EH-capable devices.

17. The network entity of claim 1, wherein, to transmit the plurality of RF signals, the at least one processor is configured to:
transmit the plurality of RF signals using time-division multiplexing (TDM), wherein the plurality of RF signals are non-overlapping in time.

18. The network entity of claim 1, wherein, to transmit the plurality of RF signals, the at least one processor is configured to:
transmit each RF signal of the plurality of RF signals using a respective non-overlapping sub-band of the plurality of sub-bands included in the wideband bandwidth.

19. The network entity of claim 1, wherein each backscatter RF signal of the first plurality of backscatter RF signals is associated with a respective plurality of sub-carriers included in the respective sub-band.

20. The network entity of claim 19, wherein the respective plurality of sub-carriers comprises a sub-carrier included in each physical resource group (PRG) of a plurality of PRGs included in the respective sub-band.

21. The network entity of claim 20, wherein:
each PRG of the plurality of PRGs includes a same quantity of sub-carriers; and
each sub-carrier included in the respective plurality of sub-carriers is associated with a same sub-carrier position.

22. The network entity of claim 20, wherein each backscatter RF signal of the first plurality of backscatter RF signals is associated with a first frequency shift away from a respective RF signal of the plurality of RF signals and a second frequency shift away from the respective RF signal.

23. The network entity of claim 22, wherein:
the first frequency shift comprises a sub-band frequency shift of one or more sub-bands included in the wideband bandwidth; and
the second frequency shift comprises a sub-carrier frequency shift of one or more sub-carriers included in each PRG of the plurality of PRGs.

24. A method of wireless communication performed by an energy harvesting (EH)-capable device, comprising:
- receiving, from a network entity, a plurality of radio frequency (RF) signals, wherein each RF signal of the plurality of RF signals is associated with a respective sub-band of a plurality of sub-bands included in a wideband bandwidth, and wherein the plurality of sub-bands comprises three or more sub-bands of the wideband bandwidth; and
- transmitting, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

25. An energy harvesting (EH)-capable device for wireless communication, comprising:
- at least one memory; and
- at least one processor coupled to the at least one memory, the at least one processor configured to:
  - receive, from a network entity, a plurality of radio frequency (RF) signals, wherein each RF signal of the plurality of RF signals is associated with a respective sub-band of a plurality of sub-bands included in a wideband bandwidth, and wherein the plurality of sub-bands comprises three or more sub-bands of the wideband bandwidth; and
  - transmit, to the network entity, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth.

26. The EH-capable device of claim 25, wherein the at least one processor is further configured to:
- receive, from the network entity, an RF signal for energy harvesting using a particular sub-band of the plurality of sub-bands, wherein the particular sub-band is associated with control information associated with the wideband bandwidth.

27. The EH-capable device of claim 26, wherein the control information comprises channel state information (CSI).

28. The EH-capable device of claim 25, wherein each respective backscatter RF signal of the plurality of backscatter RF signals comprises a respective frequency shifted backscatter of an RF signal of the plurality of RF signals.

29. A method of wireless communication performed by a network entity, comprising:
- transmitting a plurality of radio frequency (RF) signals, wherein each RF signal of the plurality of RF signals is associated with a respective sub-band of a plurality of sub-bands included in a wideband bandwidth, and wherein the plurality of sub-bands comprises three or more sub-bands of the wideband bandwidth;
- receiving, from an energy harvesting (EH)-capable device, a plurality of backscatter RF signals, wherein each backscatter RF signal of the plurality of backscatter RF signals is associated with a respective RF signal of the plurality of RF signals, wherein each backscatter RF signal and each respective RF signal are associated with a respective sub-band of the plurality of sub-bands included in the wideband bandwidth; and
- determining control information associated with the wideband bandwidth based on the plurality of backscatter RF signals.

* * * * *